US010573067B1

(12) United States Patent
Naik et al.

(10) Patent No.: US 10,573,067 B1
(45) Date of Patent: Feb. 25, 2020

(54) DIGITAL 3D MODEL RENDERING BASED ON ACTUAL LIGHTING CONDITIONS IN A REAL ENVIRONMENT

(71) Applicant: SONY CORPORATION, Tokyo (JP)

(72) Inventors: Sunilkumar Naik, Bangalore (IN); Kenji Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/108,909

(22) Filed: Aug. 22, 2018

(51) Int. Cl.
| *G06T 15/50* | (2011.01) |
| *G06T 7/90* | (2017.01) |
| *G06T 19/00* | (2011.01) |
| *G06T 15/60* | (2006.01) |
| *G06K 9/46* | (2006.01) |
| *G06K 9/38* | (2006.01) |
| *G06T 7/73* | (2017.01) |
| *G06T 7/50* | (2017.01) |
| *G06T 5/00* | (2006.01) |
| *H04N 5/232* | (2006.01) |

(52) U.S. Cl.
CPC .............. *G06T 15/506* (2013.01); *G06K 9/38* (2013.01); *G06K 9/4661* (2013.01); *G06T 7/50* (2017.01); *G06T 7/73* (2017.01); *G06T 7/90* (2017.01); *G06T 15/60* (2013.01); *G06T 19/006* (2013.01); *G06T 5/002* (2013.01); *G06T 2200/08* (2013.01); *G06T 2200/24* (2013.01); *H04N 5/23238* (2013.01)

(58) Field of Classification Search
CPC ......... G06T 15/506; G06T 15/00; G06T 7/50; G06T 7/73; G06T 7/90; G06T 15/60; G06T 19/006; G06T 5/002; G06T 2200/08; G06T 2200/24; G02B 13/06; G06K 9/38; G06K 9/4661; H04N 5/23238

See application file for complete search history.

(56) References Cited

U.S. PATENT DOCUMENTS

| 6,628,298 B1 | 9/2003 | Debevec |
| 9,122,053 B2 | 9/2015 | Geisner et al. |
| 9,411,413 B2 | 8/2016 | Motta et al. |
| 2009/0309877 A1 | 12/2009 | Snyder et al. |
| 2012/0307001 A1* | 12/2012 | Osako ............. G06T 15/20 348/36 |
| 2015/0097834 A1* | 4/2015 | Ma ............. G06T 17/05 345/426 |
| 2018/0114264 A1* | 4/2018 | Rafii ............. G06Q 30/0643 |
| 2019/0124749 A1* | 4/2019 | Deixler ............. H05B 37/0227 |

* cited by examiner

*Primary Examiner* — Haixia Du
(74) *Attorney, Agent, or Firm* — Chip Law Group

(57) ABSTRACT

A display apparatus comprises an image sensor and a control circuitry. The image sensor captures a 360° image of a real-world environment and the control circuitry detects at least one light source in the captured 360° image and determines a plurality of lighting parameters of the detected light source. A lighting condition caused by the light source in the real-world environment is reproduced on a three-dimensional (3D) model based on the determined plurality of lighting parameters. The 3D model along with 360° media content that includes at least the captured 360° image is rendered at the display apparatus such that the reproduced light condition is visible on the rendered 3D model. A minimum deviation is exhibited in representation of a light reflection caused by the light source on the rendered 3D model during visualization of the 3D model at the display apparatus in presence of the light source.

20 Claims, 14 Drawing Sheets

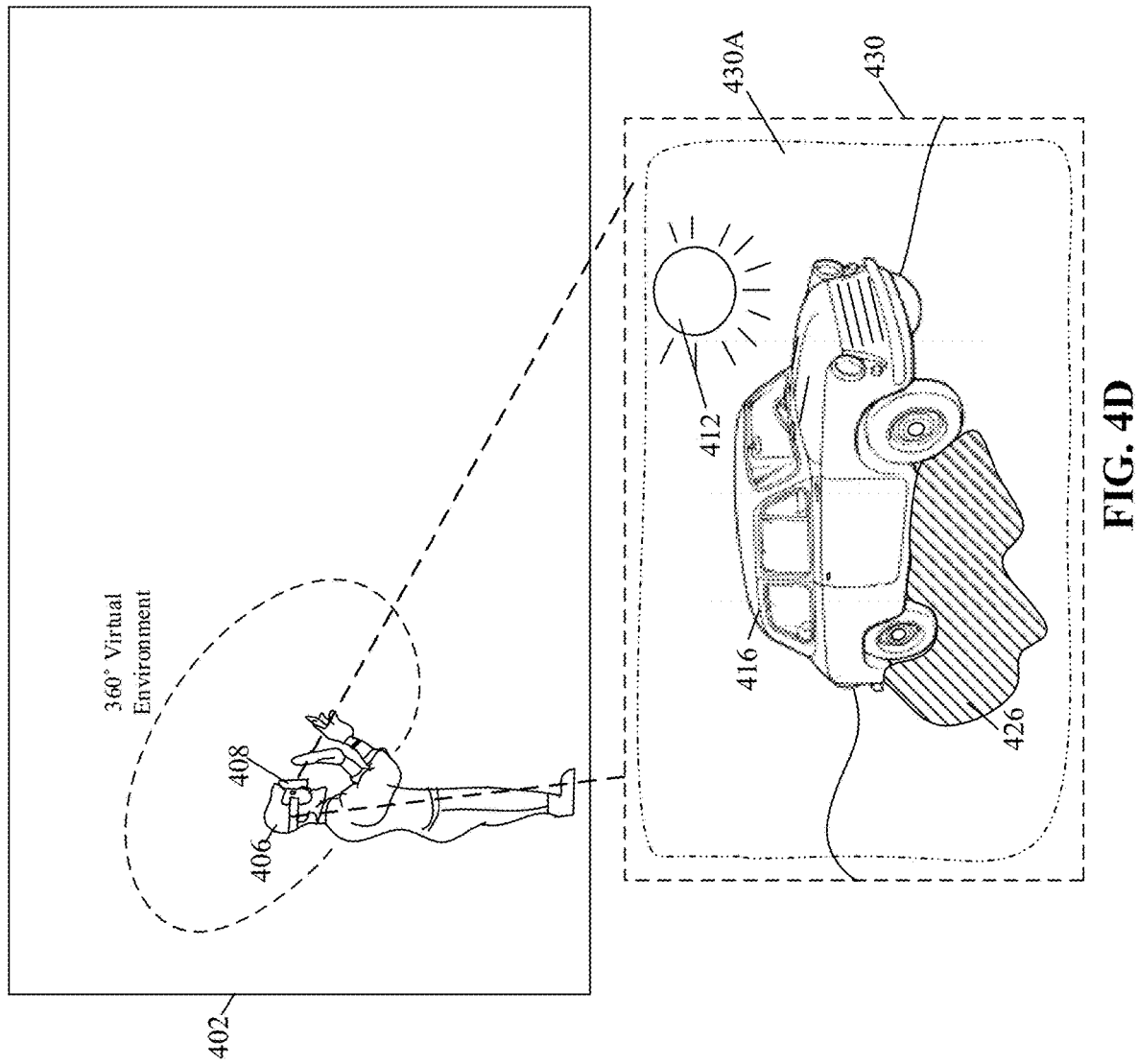

DIGITAL 3D MODEL RENDERING BASED ON ACTUAL LIGHTING CONDITIONS IN A REAL ENVIRONMENT

REFERENCE

None.

FIELD

Various embodiments of the disclosure relate to augmented reality and virtual reality technologies. More specifically, various embodiments of the disclosure relate to a display apparatus and method for digital 3D model rendering based on actual lighting conditions in a real environment.

BACKGROUND

Recent advancements in the field of computer-generated imagery (CGI) have led to rapid development of various technologies, such as augmented reality (AR) and virtual reality (VR) based technologies. Typically, a conventional media rendering apparatus, such as an AR headset, may superimpose an orthographic projection of a digital three-dimensional (3D) model into a projection (such as an image frame from a live preview) of a real-world environment, to render an AR or a VR experience to a user. In certain scenarios, a reflection of light to be displayed on a digital 3D model (e.g., a 3D computer graphic model) and shadow generation for the digital 3D model, may be preset. For example, the digital 3D model may be rendered and visualized on a display device with a fixed luminous intensity preset for a surrounding environment in which the digital 3D model is rendered. Thus, actual lighting conditions in the real-world environment may have no impact or may not be accurately represented while rendering of the digital 3D model on the display device. In such scenarios, brightness or reflections on the digital 3D model may not be commensurate with a luminous intensity of different light sources in the real-world environment. In certain other scenarios, lighting or reflection representations on the 3D model may not change with respect to changes in lighting conditions of the real-world environment. Thus, the rendered digital 3D model and the lighting or reflection representations on the 3D model may not appear realistic to viewer, which may not be desirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A display apparatus and method for digital 3D model rendering based on actual lighting conditions in a real environment, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 4A, 4B, 4C, and 4D collectively illustrate a second exemplary scenario for digital 3D model rendering based on actual lighting conditions in a real environment, in accordance with an embodiment of the disclosure.

DETAILED DESCRIPTION

Figure 1:
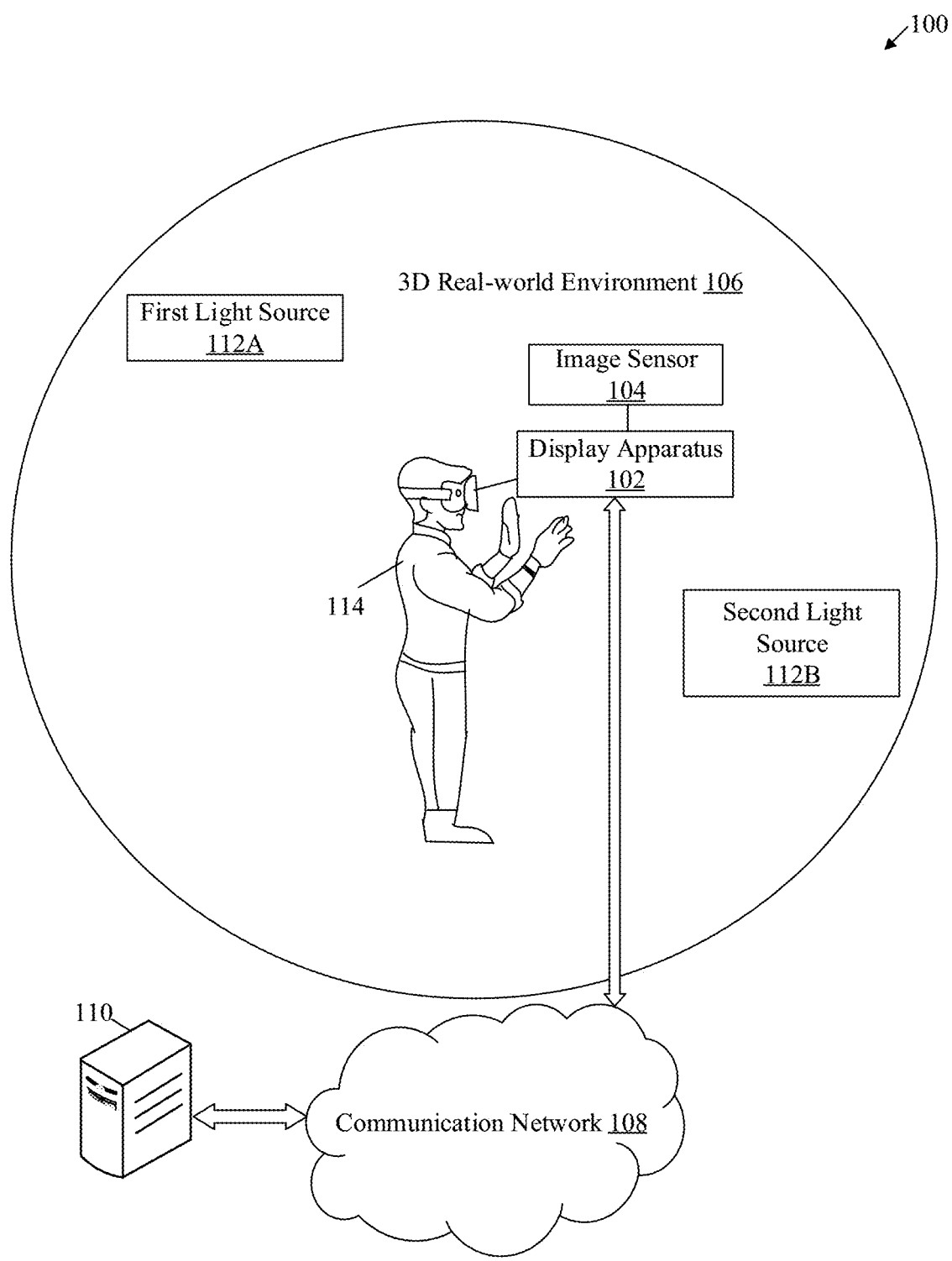
FIG. 1 is a block diagram that illustrates a network environment for digital 3D model rendering based on actual lighting conditions in a real environment, in accordance with an embodiment of the disclosure.

The following described implementations may be found in the disclosed display apparatus for digital three-dimensional (3D) model rendering based on actual lighting conditions in a real environment. Exemplary aspects of the disclosure may include a display apparatus which comprises an image sensor and control circuitry. The image sensor may be configured to capture a 360° image in a field-of-view (FOV) of the image sensor. The control circuitry may be configured to detect at least one light source in the captured 360° image based on a plurality of luminance values in a region of the captured 360° image. The detected at least one light source in the region of the captured 360° image may be at least one of a natural light source or an artificial light source in a real-world environment.

In accordance with an embodiment, the control circuitry may be configured to determine a plurality of lighting parameters of the detected at least one light source in the 360° image. The plurality of lighting parameters may be determined based on computation of at least a light intensity of light emitted by the detected at least one light source using a binary threshold image of the captured 360° image. The control circuitry may be configured to reproduce (or imitate) a lighting condition caused by the detected at least one light source in the real-world environment, on a 3D model based on the determined plurality of lighting parameters. The control circuitry may be further configured to render the 3D model along with 360° media content that includes at least the captured 360° image at the display apparatus such that the reproduced light condition is visible on the rendered 3D model that is surrounded by the 360° media content. The rendered 3D model may exhibit a minimum deviation in representation of a light reflection caused by the detected at least one light source on the rendered 3D model during visualization of the 3D model at the display apparatus in presence of the detected at least one light source. The captured 360° image may be an equirectangular image that comprises a 360° view of the real-world environment. The 3D model in the media content may be rendered in real time or near-real time at the display apparatus with ongoing capture of the 360° image from the real-world environment.

In accordance with an embodiment, the display apparatus may also include an input/output (I/O) device that receives a plurality of user inputs. The control circuitry may be further configured to customize the rendered 3D model based on the received plurality of user inputs. The I/O device is further configured to receive a first user input. The first user input may include a first user-defined light intensity to change a light intensity associated with the detected at least one light source. The control circuitry may be further configured to render the 3D model in the 360° media content such that the rendered 3D model in the 360° media content is lit by the detected at least one light source in the first user-defined light intensity.

In accordance with an embodiment, the control circuitry may be further configured to compute a total luminance intensity of the captured 360° image from a computed sum of pixel values of a plurality of pixels of the captured 360° image. The control circuitry is further configured to generate a binary threshold image from the captured 360° image, based on the computed total luminance intensity. At least an area, a shape, and a centroid of the region of the captured 360° image may be computed. The plurality of lighting parameters may be determined based on at least the computed area, the shape, and the centroid of the region of the captured 360° image.

In accordance with an embodiment, the control circuitry may be further configured to map (and convert) a spatial position of the centroid of the region that represents the detected at least one light source, to a 3D position of the at least one light source in the real-world environment using a 3D coordinate system which represents the real-world environment in a three-dimensional coordinate space. The plurality of lighting parameters may be further determined based on the 3D position of the at least one light source in the real-world environment.

In accordance with an embodiment, the control circuitry may be further configured to estimate a relative distance of the 3D model from the detected at least one light source in the real-world environment. The control circuitry may be further configured to adjust a shadow area of the rendered 3D model based on the estimated relative distance of the 3D model from the detected at least one light source. A smoothness parameter of the shadow area of the 3D model may be adjusted based on the estimated relative distance between the 3D model and the at least one light source in the real-world environment and the light intensity of the at least one light source.

In accordance with an embodiment, the control circuitry may be further configured to estimate a color of light emitted from the detected at least one light source by extraction of a color component of a plurality of pixels of the region of the captured 360 image. A plurality of regions (e.g., bright regions) may be detected in the captured 360° image. The plurality of regions corresponds to a plurality of light sources in the real-world environment. The control circuitry is further configured to determine the plurality of lighting parameters for each of the plurality of light sources.

In accordance with an embodiment, the control circuitry may be further configured to generate an illumination model, a surface reflection model, and a shadow model for the 3D model based on the determined plurality of lighting parameters for each of the plurality of light sources. The generated illumination model, the surface reflection model, and the shadow model may be applied on the 3D model to reproduce the lighting condition caused by light emitted from the plurality of light sources in the real-world environment. The control circuitry may be further configured to determine a color of each of the plurality of light sources in the real-world environment based on a color component of pixels in each of the plurality of regions. The control circuitry may be further configured to dynamically change the representation of the light reflection on the rendered 3D model or a shadow of the rendered 3D model during visualization of the 3D model at the display apparatus based on a corresponding change in an actual lighting condition in the real-world environment.

FIG. 1 is a block diagram that illustrates a network environment for digital 3D model rendering based on actual lighting conditions in a real environment, in accordance with an embodiment of the disclosure. With reference to FIG. 1, there is shown a network environment 100. The network environment 100 may include a display apparatus 102 and an image sensor 104 in a real-world environment 106. There is further shown a communication network 108, a server 110, a plurality of light sources, such as a first light source 112A and a second light source 112B, and a user 114.

In accordance with an embodiment, the display apparatus 102 may be communicatively coupled to the server 110, via the communication network 108. In some embodiments, the image sensor 104 may be integrated with the display apparatus 102. In other embodiments, the display apparatus 102 may be a separate device and may not be integrated with the image sensor 104. In such scenarios, the display apparatus 102 may be present in a vicinity of the image sensor 104 and may be communicative coupled to the display apparatus 102. In some embodiments, the network environment 100 may include a display device (not shown) that may be present at a remote location different from the display apparatus 102. In such embodiments, the display device may be communicatively coupled to the server 110 or the display apparatus 102.

The display apparatus 102 may comprise suitable logic, circuitry, interfaces, and/or code that may be configured to imitate (or reproduce) a lighting condition caused by (or generated by) one or more light sources, such as the first light source 112A, in the real-world environment 106. The display apparatus 102 enables realistic and accurate representation of lighting in an actual scene, such as the real-world environment 106, on a virtual 3D object, such as the 3D model. The display apparatus 102 may comprise one or more sensors, such as a location sensor (such as a global positioning system (GPS) sensor), a gyroscope, a depth sensor, and an accelerometer. The one or more sensors may be configured to detect a location, motion, depth information, and an orientation of the display apparatus 102 in the real-world environment 106. Examples of implementation of the display apparatus 102 may include but are not limited to an augmented reality (AR) headset, a virtual reality (VR) headset, a hybrid AR/VR head mounted device, a wearable device, a hand-held device, such as a smartphone integrated with a 360° camera or communicatively coupled to the 360° camera, a digital camera, a tablet computer, and/or a laptop computer. In accordance with an embodiment, the display apparatus 102 may be a smart-glass device, or a projection-based display apparatus.

The image sensor 104 may comprise suitable logic, circuitry, interfaces, and/or code that may be configured to capture a plurality of 360° images of the real-world environment 106. Examples of the plurality of 360° images may comprise a High Dynamic Range (HDR) image, an equirectangular 360° image, or a panoramic image. The image sensor 104 may be implemented by use of charge-coupled device (CCD) technology or complementary metal-oxide-semiconductor (CMOS) technology. In other embodiments, the image sensor 104 may be a fusion sensor that may capture a 360° image or 360° video as well as depth information. The image sensor 104 may be a 360° image sensor configured to capture an equirectangular 360° image of the real-world environment 106. Examples of implementations of the image sensor 104 may include, but are not limited to, a 360° image sensor, a 360° camera or camcorder, and a 360° action camera, or other types of image sensors.

The real-world environment 106 may be an indoor environment or an outdoor environment. Examples of the real-world environment 106 may include, but are not limited to a physical space within a building (such as a brick-and-mortar showroom, an office space, an enclosed residential space, and the like), an open space (such as a beach area, a mountainous area, a valley, an area comprising a water body, and the like), a combination of the open space and built architectures (e.g., a stadium, an outdoor musical event, and the like).

The communication network 108 may include a medium through which the display apparatus 102 may communicate with the server 104. Examples of the communication network 108 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The server 110 may comprise suitable circuitry, interfaces, and/or code that may be configured to store a plurality of three-dimensional (3D) models and a plurality of 360° media content items. The server 110 may be configured to communicate with the display apparatus 102 via the communication network 108. Examples of the server 110 may include, but are not limited to, an application server, a cloud server, a web server, a database server, a file server, a gaming server, a mainframe server, or a combination thereof.

In accordance with an embodiment, the display apparatus 102 may be a head mounted device, a smart-glass device, or a wearable display device. The image sensor 104 may be a 360° image sensor that may be integrated with the display apparatus 102. The display apparatus 102 may be worn by the user 114. In some embodiments, the image sensor 104 may not be integrated with the display apparatus 102. In such embodiments, the image sensor 104 may be a separate device attached to (or carried by) the user 114 and may be communicatively coupled to the display apparatus 102.

In operation, the display apparatus 102 may be configured to receive a user input to select a view mode. The view mode may be an AR view mode or a VR view mode. The AR view mode enables display of a mix of a three-dimensional (3D) virtual object, such as a 3D model, with a real-world, such as the real-world environment 106. The VR view mode enables display of the virtual object, such as the 3D model, alone devoid of a background, or enables display of a mix of virtual environment along with the 3D virtual object, such as the 3D model based on a defined user-preference. The 3D model may be 3D computer graphic (CG) model of a real-world object or a fantastical object. For example, the 3D model may be a texturized or non-texturized polygonal mesh model of a car, a motorcycle, a machine, or other real-world physical objects. Examples of the 3D model of the fantastical object, may include but are not limited to a digital alien spaceship model, a famous character (such as a comic character, a movie character, or a game character), or other texturized or non-texturized 3D polygonal mesh model of a fantastical object. The options for the view mode selection, defining user-preferences and other settings, may be done via an application interface rendered by the display apparatus 102.

The display apparatus 102 may be configured to acquire a first location of the display apparatus 102 from a location sensor of the display apparatus 102. The first location may correspond to a first set of coordinate values in a 3D coordinate system (such as a Cartesian coordinate system) of the real-world environment 106. The three-dimensional coordinate system may be a spherical coordinate system. For example, the first set of coordinate values may comprise latitude, longitude, and height information of the display apparatus 102 in the real-world environment 106.

In certain scenarios, the user 114 may intent to visualize a 3D model in a portion of the real-world environment 106 in an AR view. The user 114 may point the image sensor 104 of the display apparatus 102 towards the portion of the real-world environment 106 and select the AR mode. In case where the AR mode is selected, the display apparatus 102 may activate the image sensor 104 to capture a 360° view of the real-world environment 106 surrounding the display apparatus 102. The capture of the 360° view of the real-world environment 106 surrounding the display apparatus 102, may also referred to as a 360° environment capture in a real-time or near-real time. The image sensor 104 may be configured to capture a plurality of 360° images or at least one 360° image of the real-world environment 106 from a field-of-view (FOV) of the image sensor 104. The plurality of 360° images may be a sequence of equirectangular image frames, e.g., a 360° video or an HDR 360° video. In some embodiments, the image sensor 104 may be configured to communicate the captured plurality of 360° images of the real-world environment 106 to the server 110, via the communication network 108.

In accordance with an embodiment, the captured 360° image may comprise a plurality of objects of the real-world environment 106. The captured 360° image may also comprise a plurality of light sources, such as the first light source 112A and the second light source 112B, in the real-world environment 106. Examples of the plurality of light sources may include an electric light (e.g. an electric lamp or other artificial lighting), a fire-based lamp, and a natural light source (e.g., a celestial body, such as the sun). In other words, each of the plurality of light sources may be one of a natural light source or an artificial light source. In certain scenarios, a reflection of one or more light sources of the plurality of light sources on one or more reflective surfaces, such as mirrors, in the real-world environment 106, may also be considered as one of the plurality of light sources. The number of light sources (of the plurality of light sources)

present in the real-world environment 106 collectively represents actual lighting condition in the real-world environment 106.

In accordance with an embodiment, the display apparatus 102 may be configured to detect the plurality of light sources, such as the first light source 112A and the second light source 112B, in the captured 360° image. The plurality of light sources may appear as bright spots or bright regions in the captured 360° image. The plurality of light sources may be detected based on a plurality of luminance values in each region of a plurality of regions (e.g., bright regions) of the captured 360° image. For example, the first light source 112A may be detected in a first region of the captured 360° image. The plurality of luminance values for the first region may correspond to pixel values of a first set of pixels in the first region of the captured 360° image. The display apparatus 102 may be configured to recognize the plurality of light sources based on shape of the bright spots or bright regions in the captured 360° image. The detection of the plurality of light sources in the captured 360° image is explained in detail, for example, in FIG. 2.

In accordance with an embodiment, the display apparatus 102 may be configured to determine a plurality of lighting parameters of each of the plurality of light sources, such as the first light source 112A and the second light source 112B. The plurality of lighting parameters may include a shape, a size, a light intensity, a light position, and a color of each detected light source of the plurality of light sources. The determined plurality of lighting parameters may correspond to a lighting condition that is created by light emitted by the plurality of light sources in the real-world environment 106. The plurality of lighting parameters may be determined based on a luminance-based feature extraction and/or a shape-based pattern recognition, which has been explained in detail, for example, in FIG. 2.

In accordance with an embodiment, the display apparatus 102 may be configured to generate an illumination model, a surface reflection model, and a shadow model for the 3D model, based on the determined plurality of lighting parameters of each of the plurality of light sources, such as the first light source 112A and the second light source 112B. The generated illumination model, the surface reflection model, and the shadow model of the 3D model may correspond to the lighting condition from the viewpoint of the image sensor 104 at the first location. The generation of the illumination model, the surface reflection model, and the shadow model for the 3D model is explained in detail, for example, in FIG. 2.

In accordance with an embodiment, the generated illumination model may be a model that mimics the light emitted by the plurality of light sources and its effect on the 3D model. The illumination model may comprise lighting information related to how the plurality of lighting parameters, such as the shape, the size, the light intensity, the light position, and the color, may be used to model an overall lighting condition from the viewpoint of the image sensor 104 at the first location. For example, in the illumination model, what type of light beam may be emitted from the detected light source may be estimated and modeled based on the determined plurality of lighting parameters. Examples of the type of light beam may include, but are not limited to spot light, cylindrical light, a ring-shaped emitted light, a diffused light, color of light beam, an effect of a mixing different types of visible light, and the like.

In accordance with an embodiment, the generated surface reflection model may indicate a way the light emitted by the first light source 112 may be reflected from a plurality of surfaces of the 3D model. The surface reflection model may be a model that estimates what may be a pattern of reflection on the plurality of surfaces of a 3D virtual object (such as the 3D model) at the first location. The estimated pattern of reflection on the plurality of surfaces of the 3D virtual object (such as the 3D model) at the first location when presented and visualized at the display apparatus 102 may mimic as if a real object (same as the 3D model, e.g., a car) is placed at the first location and actual reflections are visible on different surfaces of the real object to the user 114 at the first location.

In accordance with an embodiment, the generated shadow model may model one or more shadow areas that indicates a shadow of the 3D model in a case where the 3D model is visualized in the real-world environment 106 in the AR mode, using the display apparatus 102. The one or more shadow areas may be generated for the 3D model by mimicking a likely effect of the light emitted by the plurality of light sources on the 3D model visualized by the user 114 by the display apparatus 102 at the first location in the real-world environment 106. Thus, the generated one or more shadow areas depends on the actual lighting condition and the light position of each of the plurality of light sources in the real-world environment 106.

In accordance with an embodiment, the display apparatus 102 may be configured to apply the generated illumination model, the surface reflection model, and the shadow model on the 3D model. The display apparatus 102 may be configured to imitate (or reproduce) the lighting condition caused by (or generated by) the plurality of light sources, such as the first light source 112A and the second light source 112B, in the real-world environment 106 by application of the illumination model, the surface reflection model, and the shadow model on the 3D model. The display apparatus 102 may be configured to render the 3D model based on the generated illumination model, the generated surface reflection model, and the generated shadow model.

In accordance with an embodiment, the display apparatus 102 may be configured to render the 3D model in media content for a mixed visualization by the user 114. In the AR mode, the media content may be a 360° live preview of the captured scene of the real-world environment 106. Alternatively stated, the display apparatus 102 provides the ability to visualize a virtual object, such as the 3D model, in a real environment (e.g., the real-world environment 106), where each physical object or virtual object in the captured scene of the real-world environment 106 is illuminated by 360° environment light. This enables virtual graphics, such as the rendered 3D models, to represent the real-world lighting effect of a real-world scene captured by the image sensor 104 (i.e., a 360° camera).

In a case where the 3D model is rendered prior to the application of the illumination model, the generated surface reflection model, and the generated shadow model, the lighting, shadow or reflection on the 3D model may appear artificial and in accordance to preset lighting set for the rendered scene. After application of the generated surface reflection model, and the generated shadow model, the 3D model may exhibit a minimal appearance bias in visualization of the 3D model in presence of the detected plurality of light sources, such as the first light source 112A and the second light source 112B. Alternatively stated, lighting, reflection, and shadow reproduced and displayed on the 3D model (e.g., a 3D model of car) may mimic the lighting, the reflection, and shadow visible on a corresponding real object (e.g., a physical car) if placed under the lighting condition generated by the detected plurality of light sources in the real-world environment 106.

In accordance with an embodiment, the user 114 who may be wearing the display apparatus 104 (e.g., the HMD device) may move to a second location from the first location in the real-world environment 106. The display apparatus 102 then may be further configured to update a current location of the display apparatus 102 (and the user 114 to the second location. The location may be updated based on sensor data received from the location sensor of the display apparatus 102. In some embodiments, an indoor positioning system may be used in cases where weak location signals are received from the location sensor. The second location may correspond to a second set of coordinate values in the 3D coordinate system (such as a Cartesian coordinate system) of the real-world environment 106. Similar to the operations at the first location, the display apparatus 102 may further capture a 360° view of the real-world environment 106 in real time or near-real time surrounding the display apparatus 102 at the second location. Thereafter, a plurality of new lighting parameters based on the captured 360° view (e.g., a new 360° image) may be further determined from the viewpoint of the image sensor 104 at the second location.

In accordance with an embodiment, the display apparatus 102 may be configured to update the generated illumination model, the surface reflection model, and the shadow model for the second location. The display apparatus 102 may be configured to further reproduce (or imitate) the lighting condition generated by the plurality of light sources, such as the first light source 112A and the second light source 112B, in the real-world environment 106 by application of the updated illumination model, the surface reflection model, and the shadow model on the 3D model. The display apparatus 102 may be configured to re-render the 3D model based on the updated illumination model, the surface reflection model, and the shadow model that are applied on the 3D model.

In some embodiments, the display apparatus 102 may be configured to receive one or more user inputs. The one or more user inputs, from example, from the user 114, may be a voice-based input, a text-based input, or a gesture-based input. The one or more inputs may comprise user preferences of a user, such as the user 114, to customize the 3D model. The customization, for example, may be specific for a specific 3D model. For example, if the 3D model is a 3D CG car model, then the user 114 may provide an input to open a door of a car, change car model, rotate the car, visualize the interior of the 3D model, zoom out or zoom in certain portions of the 3D model, change seats, or perform customizations of the 3D model as per choice. Similarly, if the 3D model is a textured 3D CG refrigerator model, then the allowed customization provides an enhanced user experience that is similar to what a user, such as the user 114, may do in real-world (or physical checking) visualization and physical interaction with a real object. For example, the user 114 may visualize a different model or change color of 3D model, and the like. The display apparatus 102 may be configured to modify the generated illumination model, surface reflection model, and shadow model of the 3D model in accordance with the received one or more user inputs for the customization. In such cases, the display apparatus 102 may be configured to re-render the customized 3D model with modified illumination model, surface reflection model, and shadow model at the display apparatus 102 such that the customized 3D model that is rendered exhibits a minimum deviation (or appearance bias) in visualization of the customized 3D model in presence of the detected plurality of light sources, such as first light source 112A and the second light source 112B.

In some embodiments, the display apparatus 102 may be configured to receive a user input to control light intensity to visualize the rendered 3D model in different lighting conditions. The display apparatus 102 may be configured to provide an option (e.g., a UI control) to allow a user, such as the user 118, to change light intensity as per the user's preference. The different lighting conditions discussed above may be different from the lighting condition in the real-world environment 106. For example, in a first lighting condition, the first light source 112A may have a first user-defined light intensity. The display apparatus 102 may be configured to modify the illumination model, the shadow model, and the surface reflection model such that a light intensity of the first light source 112A is equal to the first user-defined light intensity. The display apparatus 102 may be configured to update the lighting and reflection on the 3D model based on the modified illumination model, surface reflection model of the 3D model in the real-world environment 106. Similarly, one or more shadow areas that mimic a shadow of the 3D model may also be updated based on the modified shadow model based on the changed light intensity. For example, if the light intensity is reduced, the shadow may dynamically change from a hard shadow to a soft shadow. The hard shadow and the soft shadow may be generated based on a change in brightness values assigned to pixels (or voxels in case of 3D model) in shadow areas of the 3D model with respect to a threshold value.

In accordance with an embodiment, the display apparatus 102 may be configured to dynamically update the lighting and/or reflection rendered on the 3D model in case there is a change in the lighting condition in the real-world environment 106. Similarly, a shadow of 3D model may also be automatically updated based on the change in the lighting condition in the real-world environment 106. For example, a new light source, such as an electric torch, may be shone by the user 118 in the real-world environment 106. In such cases, as the image sensor 104 captures 360° video of the real-world environment 106 in real time or near real time, the display apparatus 102 may be configured to detect the new light source and compute the plurality of lighting parameters for the new light source. In some embodiments, the display apparatus 102 may be configured to track the plurality of lighting parameters of the new light source, such as the electric torch, in each image frame of the captured 360° video. The display apparatus 102 may be configured to dynamically modify the illumination model, the surface reflection model, and the shadow model applied the 3D model based on the tracked plurality of lighting parameters of the new light source. Alternatively stated, the display apparatus 102 may be configured to imitate (or reproduce) a dynamically changing lighting condition and accordingly lighting or a reflection of such new light emitted from the new light source may be visible on the 3D model during visualization of the 3D model using the display apparatus 102.

In accordance with an embodiment, the display apparatus 102 may be configured to receive a user input via the application interface rendered at the display apparatus 102, to select the VR view mode instead of the AR view mode. In the VR mode, in case an option to present the 3D model alone devoid of a background, is selected, the display apparatus 102 may remove the display of the 360° video surrounding the 3D model at the display apparatus 102. Further, in the VR mode, an option to present the 3D model within a user-selected virtual environment, may be opted at the display apparatus 102. In such a case, a 360° media content that is different from the 360° video of the captured real-world environment 105, may be presented at the display apparatus 102. Further, the 3D model may be visualized within the 360° media content (a virtual environment). In this case, the display apparatus 102 may be configured to determine the plurality of lighting parameters based on brightness of the rendered 360° media content, and accordingly update the lighting and/or reflection rendered on the 3D model to imitate the lighting condition of the rendered 360° media content (i.e., the rendered virtual environment).

Figure 2:
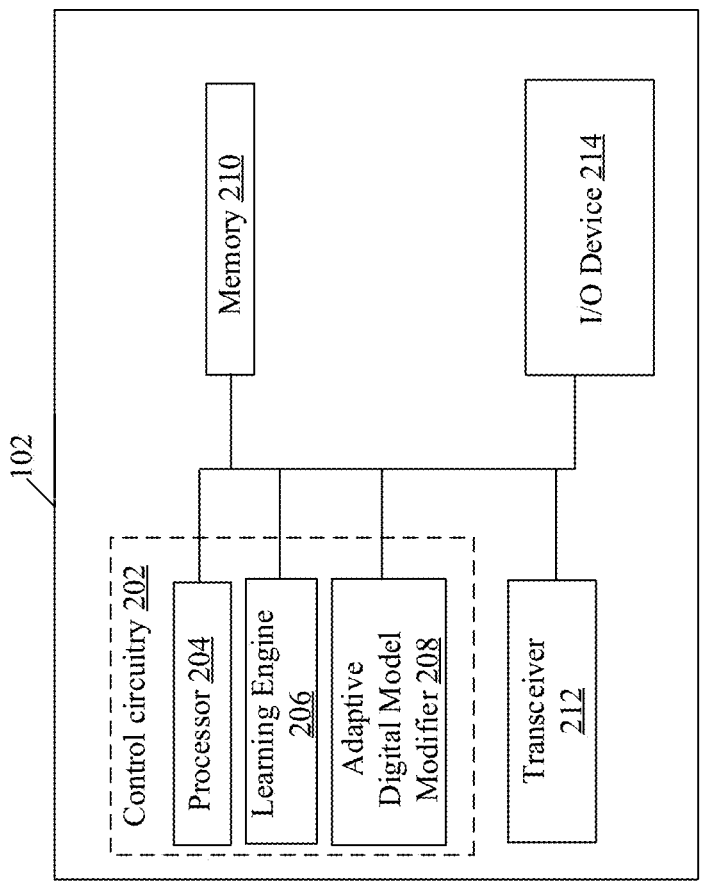
FIG. 2 is a detailed block diagram that illustrates an exemplary image-processing apparatus for digital 3D model rendering based on actual lighting conditions in a real environment, in accordance with an embodiment of the disclosure.

FIG. 2 is a detailed block diagram that illustrates a display apparatus for digital 3D model rendering based on changes in actual lighting conditions in a real environment, in accordance with an embodiment of the disclosure. FIG. 2 is explained in conjunction with elements from FIG. 1. With reference to FIG. 2, the display apparatus 102 comprises a control circuitry 202 that includes a processor 204, a learning engine 206, and an adaptive digital model generator 208. The display apparatus 102 further comprises a memory 210, a transceiver 212, and an input/output (I/O device) 214.

The processor 204 may comprise suitable logic, circuitry, interfaces, and/or code that may be configured to execute a set of instructions stored in the memory 210. The processor 204 may be configured to generate the illumination model, the surface reflection model, and the shadow model of the 3D model. The processor 204 may be configured to determine the plurality of lighting parameters of the plurality of light sources, such as the first light source 112A and the second light source 112B, in the captured 360° image. Examples of the processor 204 may include an Application-Specific Integrated Circuit (ASIC) processor, a Complex Instruction Set Computing (CISC) processor, and/or other hardware processors.

The learning engine 206 may comprise suitable logic, circuitry, interfaces, and/or code that may be configured to learn a plurality of different shapes of light sources, such as the plurality of light sources, in the captured 360° image. The learning engine 206 may be configured to recognize the plurality of different shapes of light sources. in the captured 360° image. Examples of implementations of the learning engine 206 may be a machine learning (ML) engine, a supervised or a non-supervised artificial intelligence (AI) engine, a rule engine, a support vector machine (SVM), or a neural network-based circuit.

The adaptive digital model modifier 208 may be further configured to generate the illumination model, the surface reflection model, and the shadow of the 3D model based on the determined plurality of lighting parameters of the plurality of light sources. In some embodiments, the adaptive digital model modifier 208 may also include a shader. The shader may be configured to generate the shadow model. In some embodiments, the functionalities of the shader may be implemented in the adaptive digital model modifier 208. Examples of implementations of the adaptive digital model modifier 208 may be a specialized processor, such as Application-Specific Integrated Circuit (ASIC) processor, a Graphics Processing Unit (GPU), a Reduced Instruction Set Computing (RISC) processor, a Complex Instruction Set Computing (CISC) processor, a microcontroller, a central processing unit (CPU), and/or other control circuits.

The memory 210 may comprise suitable logic, circuitry, and/or interfaces that may be configured to store a set of instructions executable by the processor 204, the learning engine 206, and the dynamic digital model generator 208. The memory 204 may be configured to store the plurality of 360° images or 360° video captured by the image sensor 104. The memory 204 may be configured to store a plurality of 3D models. The plurality of 3D models may be textured and rigged 3D models. Examples of implementation of the memory 204 may include, but are not limited to, Random Access Memory (RAM), Read Only Memory (ROM), Hard Disk Drive (HDD), and/or a Secure Digital (SD) card.

The transceiver 212 may comprise suitable logic, circuitry, interfaces, and/or code that may be configured to communicate the captured plurality of 360° images or the 360° video from the image sensor 104 to the display apparatus 102, via the communication network 108. The transceiver 212 may implement known technologies to support wired or wireless communication with the communication network 110. The transceiver 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 214 may comprise suitable logic, circuitry, interfaces, and/or code that may be configured to receive one or more inputs from a user, such as the user 114. The I/O device 214 may comprise various input and output (a display) controls or devices that may be configured to receive input and provide output to the user 114. In cases where the I/O device 214 is a separate device or control, the input, or output signal may be communicated by the I/O device 214 to the display apparatus 102 or the server 110. Examples of the input devices may include, but not limited to, a touch screen, a keyboard, a mouse, a joystick, a microphone, and/or the image sensor 104 (FIG. 1). Examples of the output devices may include, but not limited to, a display screen (such as a smart-glass display, a projector screen, an optical HMD, a HMD display, Liquid Crystal Display (LCD), or a Light Emitting Diode (LED) display) and/or a speaker. The application interface may be rendered on the display screen.

The control circuitry 202 may be configured to execute a sequence of image processing operations for determination (or extraction) of the plurality of lighting parameters from the captured 360° image. The processor 204 of the control circuitry 202 may be configured to compute a total luminance intensity of the captured 360° image based on a plurality of pixel values of the captured 360° image. The total luminance intensity of the captured 360° image may be equal to a computed sum of the plurality of pixel values of the captured 360° image. The plurality of pixel values of the captured 360° image corresponds to all pixel values of the captured 360° image. Further, the processor 204 may be configured to compute an average luminance of the captured 360° image based on a width of the captured 360° image, and a height of the captured 360° image. For example, the width of the captured 360° image may be equal to a first number of pixels in each row of the captured 360° image. The height of the captured 360° image may be equal to a second number of pixels in each column of the captured 360° image. The average luminance of the captured 360° image may be equal to a quotient of a division operation between the computed total luminance intensity and a computed product of the width and the height of the captured 360° image. The average luminance of the captured 360 image may be represented, for example, by equation (1).

$$\text{Average Luminance} = \frac{\text{Total Luminance intensity}}{\text{Width of captured 360° image} \times \text{Height of captured 360° image}} \quad (1)$$

In accordance with an embodiment, the processor 204 may be configured to compute an input luminance threshold based on the average luminance of the captured 360° image and a maximum value (e.g., 255 for a 8-bit grayscale image) of a range of grayscale values (0 to 255, where "0" indicates black and "255" indicates "white"). The input luminance threshold of the captured 360° image may be represented, for example, by equation (2).

$$\text{Input Luminance Threshold} = \frac{255}{\text{Average Luminance}}, \quad (2)$$

In accordance with an embodiment, the processor 204 may be configured to generate a binary threshold image based on the input luminance threshold. The binary threshold image may comprise a plurality of regions (of the captured 360° image), each of which may have a plurality of luminance values which are greater than the input luminance threshold. The plurality of light sources may appear as bright spots or bright regions in the captured 360° image. The plurality of regions (i.e. bright regions) of the captured 360° image may correspond to the plurality of light sources in the real-world environment 106. The processor 204 may be configured to detect a first region from the plurality of regions in the captured 360° image. The first region may correspond to the first light source 112A in the real-world environment 106. The processor 204 may be configured to detect the first light source 112A in the real-world environment 106, based on the plurality of luminance values of the plurality of pixels in the first region of the captured 360° image. Similarly, the processor 204 may be configured to detect a second region from the plurality of regions in the captured 360° image. The second region from the plurality of regions in the captured 360° image may include a plurality of luminance values greater than the input luminance threshold.

In accordance with an embodiment, the processor 204 may be configured to determine the plurality of lighting parameters by the luminance-based feature extraction and the shape-based pattern recognition of the detected first light source 112A in the generated binary threshold image. In other embodiments, the control circuitry 202 may be configured to determine the plurality of lighting parameters by the luminance-based feature extraction and the shape-based pattern recognition of the detected first light source 112A in the captured 360° image.

Luminance-Based Feature Extraction

In accordance with an embodiment, the processor 204 may be configured to determine the plurality of lighting parameters of the first light source 112A based on the plurality of luminance values of the first region of the captured 360° image. For example, the processor 204 may be configured to compute an average of the plurality of luminance values of the first region of the captured 360° image. The processor 204 may be configured to compare the computed average of the plurality of luminance values with a plurality of luminance threshold. Each of the plurality of luminance thresholds may correspond to a luminance range of a different type of light source in a plurality of types of light sources. Examples of the plurality of types of light sources may include a candle, a tube light, a bonfire, the sun, and the moon. For example, a first luminance threshold and a second luminance threshold of the plurality of luminance thresholds may correspond to a first luminance range associated with the candle.

In accordance with an embodiment, the processor 204 may be configured to identify the first light source 112A based on the comparison of the computed average of the plurality of luminance values with the plurality of luminance thresholds. In the case where the average of the plurality of luminance values of the first region is between the first luminance threshold and the second luminance threshold, then the processor 204 may be configured to identify the first light source 112A to be the candle. The processor 204 may be configured to determine the plurality of luminance parameters for the first light source 112A based on the identification of the first light source 112A by use of the learning engine 206 or a plurality of machine learning algorithms stored in the memory 210 and/or the server 110. Similarly, other types of light sources, such as the second light source 112A may be identified based on the plurality of luminance thresholds. In some cases, the comparison of the computed average of the plurality of luminance values with the plurality of luminance thresholds, may not identify the plurality of regions in the captured 360° image (or 360° video) with cent percent certainty. For example, when the computed average of the plurality of luminance values of two different light sources is similar or light intensity changes in real time or near real time because of voltage fluctuations, the comparison of the computed average of the plurality of luminance values with the plurality of luminance thresholds may not identify the plurality of region.

Shape-Based Pattern Recognition

In accordance with an embodiment, the processor 204 may be configured to learn a plurality of different shapes of light sources, such as the plurality of light sources, in the captured 360° image. The learning engine 206 may be configured to recognize the plurality of different shapes of the plurality of light sources. The processor 204 may be configured to compute an area of each region of the plurality of regions (i.e. bright regions) of the captured 360° image. For example, the processor 204 may be configured to compute an area and a centroid of the first region based on a spatial position of each of a plurality of pixels in the first region. The computed area of the first region may correspond to a size of the first light source 112A as captured in the 360° image. The processor 204 may be configured to identify the first light source 112A based on the computed area and the computed shape of the first region by use of the learning engine 206. The computed shape of the first region of the captured 360° image may correspond to a shape of the first light source 112A. For example, in cases where the computed shape of the first region is circular, the first light source 112A may be spherical. In some embodiments, the processor 204 may be configured to identify the first light source 112A based on the identified shape of the first light source 112A and a color component of a plurality of pixels of the first region. In cases where the identified shape of the first light source 112A is spherical, the color component of the plurality of pixels of the first region indicates is red or orange, and there is no other light source as bright or at a position of the first light source 112A, then the processor 204 may be configured to identify the first light source 112A as the sun. The processor 204 may be configured to identify the type of the first light source 112A from the plurality of different types of light sources.

In accordance with an embodiment, the processor 204 may be configured to determine a position of each of the plurality of light sources in the real-world environment 106 using a corresponding centroid of the plurality of regions (e.g., the bright regions) in the captured 360° image. To determine the position of each of the plurality of light sources in the real-world environment 106, a spatial position of each centroid of the plurality of regions may be converted to a corresponding 3D position in the real-world environment 106 using a 3D coordinate system, for example, 3D Cartesian coordinate system. Thus, the computed centroid may indicate an angle or an orientation of the first light source 112A with respect to the image sensor 104. Further, a relative distance of the first light source 112A from the image sensor 104 that captures the 360° image, may also be computed based on the depth information or computed position of each of the plurality of light sources.

In accordance with an embodiment, the processor 204 may be further configured to determine a color of light emitted by the plurality of light sources from a color component of the plurality of pixels in each of the plurality of regions (i.e. the bright regions) in the captured 360° image. For example, the first light source 112A may emit a light that falls in the red portion of the visible spectrum of light. Thus, in the captured 360°, the color component of the plurality of pixels of the detected first region, may have pixels values indicating red component. Alternatively, stated, in cases where a color component of each of the plurality of pixels (or majority of the plurality of pixels) of the first region indicates a red color, then the color of light emitted by the first light source 112 may be determined to be red.

In accordance with an embodiment, the processor 204 may be further configured to calculate a light intensity for each of the plurality of light sources, such as the first light source 112A and the second light source 112B, using the captured 360° image. The light intensity for each of the plurality of light sources is computed based on a light area (area of each region of the plurality of regions), a binary threshold image (overall brightness of the image), and a control value.

$$\text{Light intensity} = A * AB * \text{control value} \quad (3),$$

where A is a computed area of each region of the plurality of regions (i.e. bright regions) in the 360° image;
AB is average (overall) brightness from the binary threshold image or average luminance from equation (1); and
control value is a reference value.

In accordance with an embodiment, the processor 204 may be configured to assign a plurality of weights to the plurality of light sources. The plurality of weights may be assigned based on at least the computed light intensity (equation 3), sensor type (of the image sensor 104 or light type, LED, Infra-red (IR), and the like), position of a light source, and color of a light source.

TABLE 1

Weightage calculation for the plurality of light sources.

|  | First Light Source | Second Light Source | Third Light Source | Fourth Light Source |
|---|---|---|---|---|
| Light Intensity (Lumens) | L1 | L2 | L3 | L4 |
| Sensor type | S1 | S2 | S3 | S4 |
| Depth | D1 | D2 | D3 | D4 |
| Position (X, Y, Z) | P1 (X1, Y1, Z1) | P2 (X2, Y2, Z2) | P3 (X3, Y3, Z3) | P4 (X4, Y4, Z4) |
| Color (Hex) | C1.RGB e.g. #FF0000 | C2.RGB e.g. #00FF00 | C3.RGB e.g. #800080 | C4.RGB e.g. #FF00FF |
| Weightage | W1 | W2 | W3 | W4 |

The plurality of weights may be calculated using the equation (4) given below:

$$\text{Weightage} = L1(\text{light Intensity}) * (S1(\text{average or a real value}) + D1) * C1 \quad (4)$$

In accordance with another embodiment, the processor 204 may be further configured to predict a light model of the plurality of light sources, such as the first light source 112A, based on the determined shape, the determined size, and the determined position of each of the plurality of light sources in the real-world environment 106. The light model of the first light source may be one of a direct light model, a point light model, a spot light model, a cylindrical light model, a disk light model, a quad light model, a photometric light model, and a mesh light model. The light model may indicate a manner in which light from a light source may be emitted and how it may affect reflection on the objects in the real-world environment 106. In certain scenarios, the processor 204 may be configured to store information associated with the plurality of light sources and a plurality of predicted light models in the memory 210 or the server 110. An example of the stored information is given below, for example in Table. 1.

| SI no. | Type of light source | Predicted light model |
|---|---|---|
| 1 | Sun | Direct light model |
| 2 | Laser diode | Point light model |
| 3 | Table lamp | Spot light model |
| 4 | Kitchen light | Quad light model |
| 5 | Fireplace light | Direct light model |
| 6 | Tube light | Quad light model |
| 7 | Moon | Diffused light model |

The processor 204 may be configured to determine the plurality of lighting parameters of each of the plurality of light sources based on the determined shape, size, position, and light intensity associated with each of the plurality of regions of the captured 360° image. The adaptive digital model modifier 208 may be configured to generate the illumination model, the surface reflection model, and the shadow model for the 3D model based on the determined the plurality of lighting parameters. In some embodiments, the adaptive digital model modifier 208 may be configured to utilize the plurality of weights assigned to the plurality of light sources for the generation of the illumination model, the surface reflection model, and the shadow model. For example, if a higher weight is assigned to a light source, such as the second light source 112B, it may indicate that a reflection on the 3D model will have a higher impact from the second light source 1128 as compared to other light sources of the plurality of light sources. In accordance with an embodiment, the generated illumination model, the generated surface reflection model, and the generated shadow model of the 3D model may correspond to a cumulative lighting condition generated by the plurality of light sources in the real-world environment 106. The cumulative lighting condition may be an overall lighting from the plurality of light sources in the real-world environment 106.

In some embodiments, the adaptive digital model modifier 208 may be configured to adjust the shape and the shadow offset of the generated shadow model of for the 3D model based on the predicted light model of each of the plurality of light sources. The adaptive digital model modifier 208 may be configured to adjust the shape and the shadow offset of the generated shadow model, based on a current position, relative distance, or angle of the display apparatus 102 (i.e., from a viewpoint of the user 114 who may wear the display apparatus 102) with respect to a light source (highly weighted light source) or each of the plurality of light sources.

The adaptive digital model modifier 208 may be configured to adjust a smoothness parameter (e.g., a hard shadow or a light shadow) of the shadow based on the estimated relative distance between the 3D model and each of the plurality of light sources, such as the first light source 112A in the real-world environment 106. The adaptive digital model modifier 208 may be further configured to adjust a hue of the generated shadow model of the 3D model based on the determined color of the light emitted by one or more of the plurality of light sources. In accordance with an embodiment, the adaptive digital model modifier 208 may be configured to generate a mix of color components, for example a mix of white, red, and other lights, for the generated illumination model, the generated surface reflection model, and the generated shadow model of the 3D model, based on the estimated color of light emitted by the one or more light sources of the plurality of light sources.

In conventional display apparatuses, the illumination model, the surface reflectance model, and the shadow of the 3D model may not be generated based on an actual lighting condition in the real-world environment 106. Further, in conventional display apparatuses, the illumination model, the surface reflectance model, and the shadow of the 3D model remain static when lighting conditions in the real-world environment 106 change. Hence, in conventional systems, the 3D model may not look realistic in the real-world environment 106. In contrast, the display apparatus 102 generates the illumination model, the surface reflectance model, and the shadow of the 3D model based on the plurality of lighting parameters of the plurality of light sources of the real-world environment 106. Further, the display apparatus 102 may be configured to modify the illumination model, the surface reflection model, and the shadow model of the 3D model in accordance with changes in actual lighting conditions in the real-world environment. Hence, the display apparatus 102 may be configured to provide a realistic depiction of the 3D model in the real-world environment 106 (in the AR view mode) as well when the 3D model is visualized in the virtual environment (i.e. in the VR view mode).

The functions and/or operations performed by the display apparatus 102 (as described in FIG. 1) may be executed by the processor 204, the learning engine 206, and/or the adaptive digital model modifier 208. Other operations performed by the processor 204, the learning engine 206, and/or the adaptive digital model modifier 208 are further described, for example, in FIGS. 3A, 3B, 3B, 3C, 3D, 4A, 4B, 4C, 4D, 5A, 5B, 6A, 6B, 6C, and 6D.

Figure 3A:
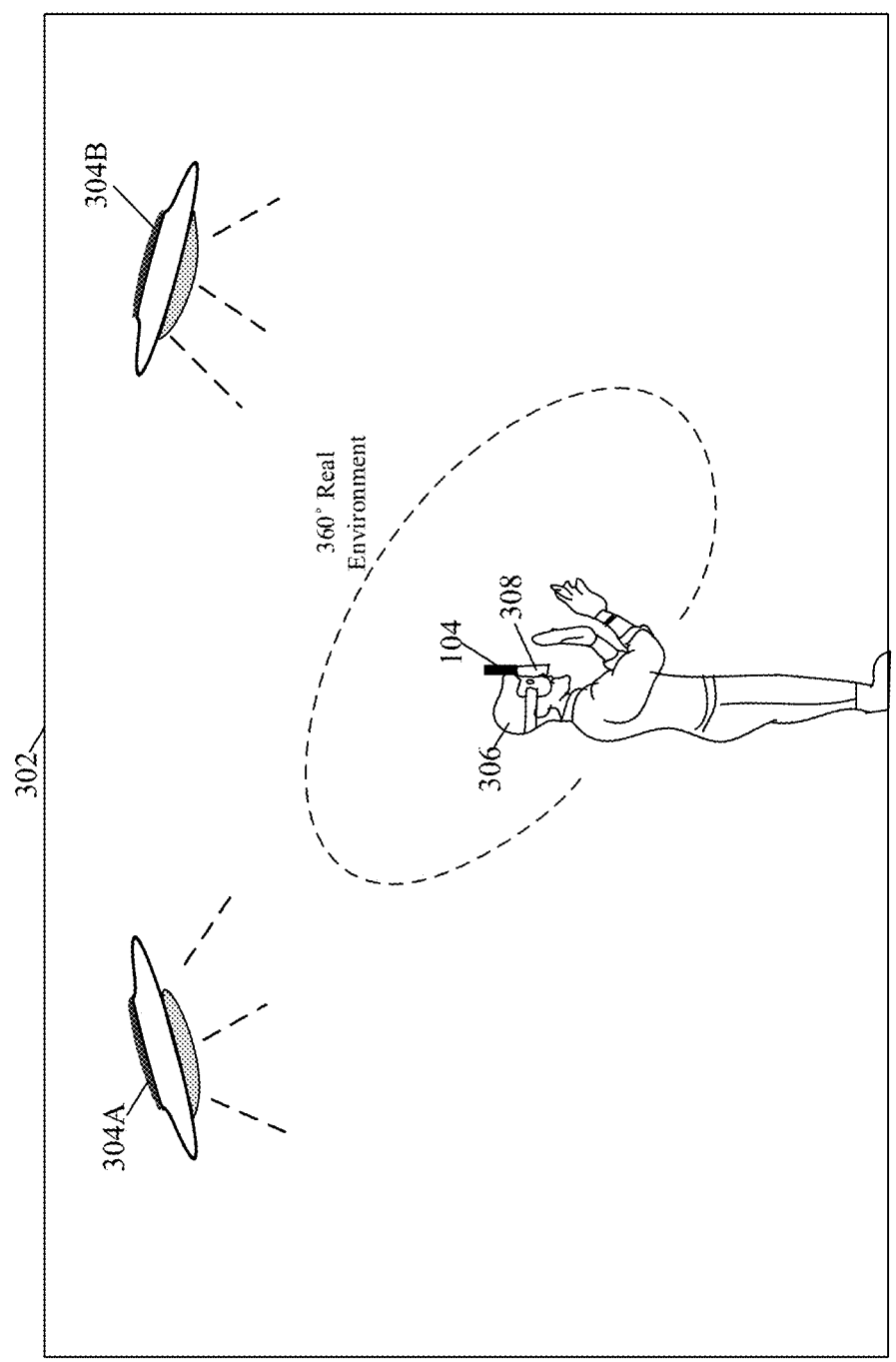
FIGS. 3A, 3B, 3C, and 3D collectively illustrate a first exemplary scenario for digital 3D model rendering based on actual lighting conditions in a real environment, in accordance with an embodiment of the disclosure.

FIGS. 3A, 3B, 3C, and 3D collectively illustrate a first exemplary scenario for implementation of the disclosed display apparatus and method for digital 3D model rendering based on actual lighting conditions in a real environment, in accordance with an embodiment of the disclosure. FIGS. 3A to 3D are explained in conjunction with elements from FIG. 1 and FIG. 2. With reference to FIG. 3A, there is shown a three-dimensional (3D) real-world environment 302 (which corresponds to the real-world environment 106 (FIG. 1)). The 3D real-world environment 302 may comprise a plurality of light sources, such as a first light source 304A and a second light source 304B. Light emitted by the first light source 304A and the second light source 304B may together create a first lighting condition in the 3D real-world environment 302.

A display apparatus 308, such as a HMD device, may be worn by a user 306 who may be present in the 3D real-world environment 302. The display apparatus 308 may correspond to the display apparatus 102 (FIG. 1). Although the display apparatus 308 is shown as an HMD device in the first exemplary scenario, the display apparatus 308 may be other types of wearable devices, such as a smart-glass, a hand-held device, and the like. The display apparatus 308 may include the image sensor 104 which may be configured to capture a 360° image of the 3D real-world environment 302. In some embodiments, instead of one 360° camera, a plurality of cameras, such as three image sensors may be attached to the body of the user 306 or the display apparatus 308, and the captures images from the plurality of cameras may be combined to form a 360° image of the 3D real-world environment 302. The 360° image of the 3D real-world environment 302 provides an enhanced representation of overall lighting condition in the 3D real-world environment 302 as compared to an image that captures a limited field-of-view of the 3D real-world environment 302.

In certain scenarios, the user 306 may intend to visualize a first 3D model at a certain portion of the 3D real-world environment 302. For example, the user 306 may intent to visualize a car in the portion of the 3D real-world environment 302. In such scenarios, the user 306 may provide an input on an application interface rendered on a display screen of the display apparatus 308. The input may be a gesture-based input, a voice-based input, or a touch-based input. The application interface may include details (or preview) associated with a plurality of 3D models which may be possibly visualized in the portion of the 3D real-world environment 302. The user 306 may select the first 3D model from the plurality of 3D models shown in the application interface of the display apparatus 308.

In certain scenarios, the 3D real-world environment 302 may be a vehicle showroom, such as a car showroom. The plurality of 3D models may correspond to 3D CG models of a plurality of vehicles (e.g., cars). In certain scenarios, the selected first 3D model may correspond to a first car. The display apparatus 308 may be configured to receive an input to select a view mode via the application interface. In this case, the view mode may be selected as AR view mode. The user 306 may further provide a plurality of inputs to customize the rendered first 3D model (i.e., a 3D CG model of the first car). The plurality of inputs may comprise user preferences of the user 306 to customize the first 3D model. For example, the user 306 may provide an input to open a door of a car, change car model, rotate the car, visualize the interior of the first 3D model, zoom out or zoom in certain portions of the first 3D model, change seats, or perform customizations of the first 3D model as per choice. In another example, the user 306 may provide one or more inputs to the display apparatus 308 via the application interface to customize the 3D model of the first car such that the 3D model of first car is fitted with a first type of headlights. Based on a specific input, the display apparatus 308 may render an updated 3D model where the different customizations are rendered in accordance with user input. For example, the 3D model may be visualized fitted with the first type of headlights.

Figure 3B:
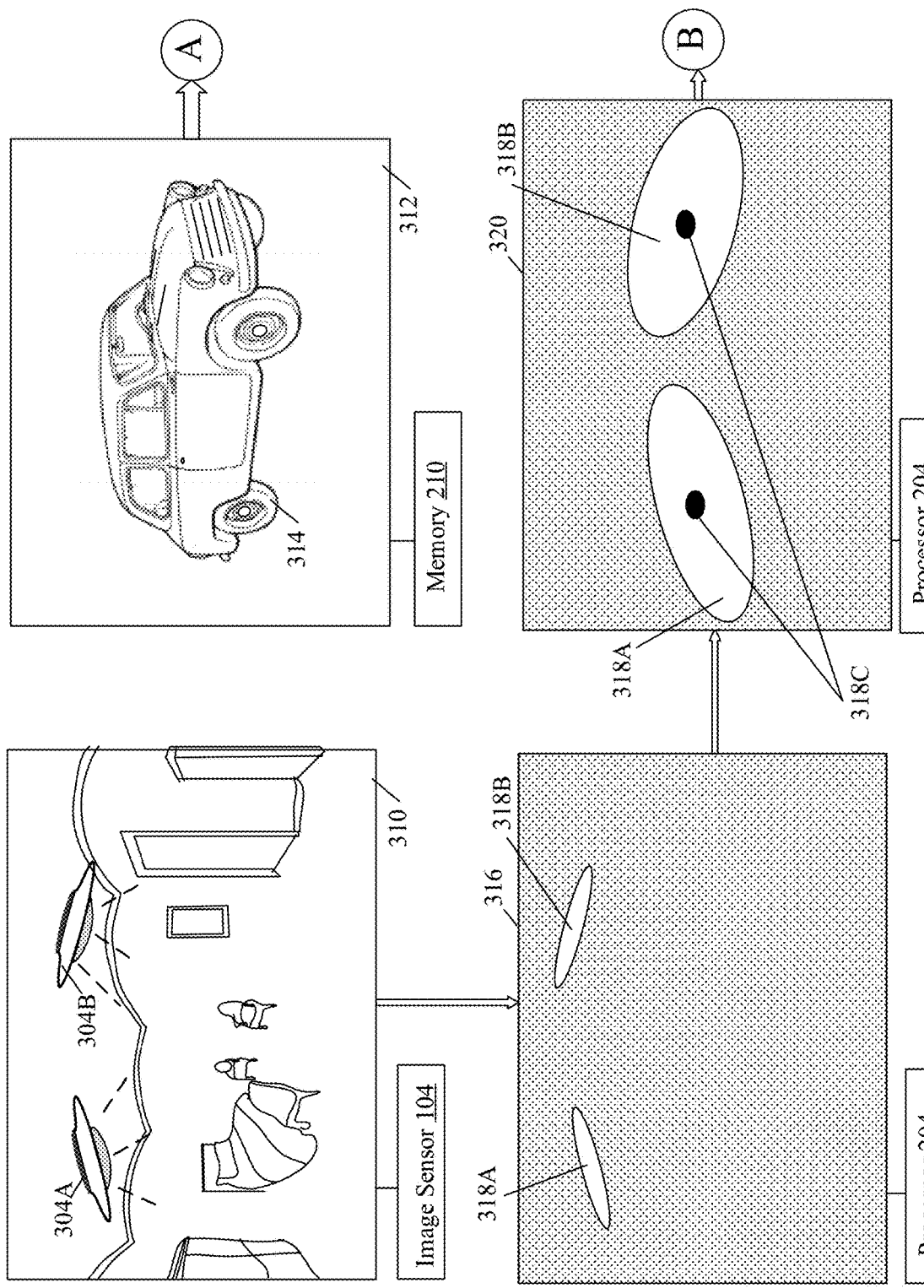
Figure 3C:
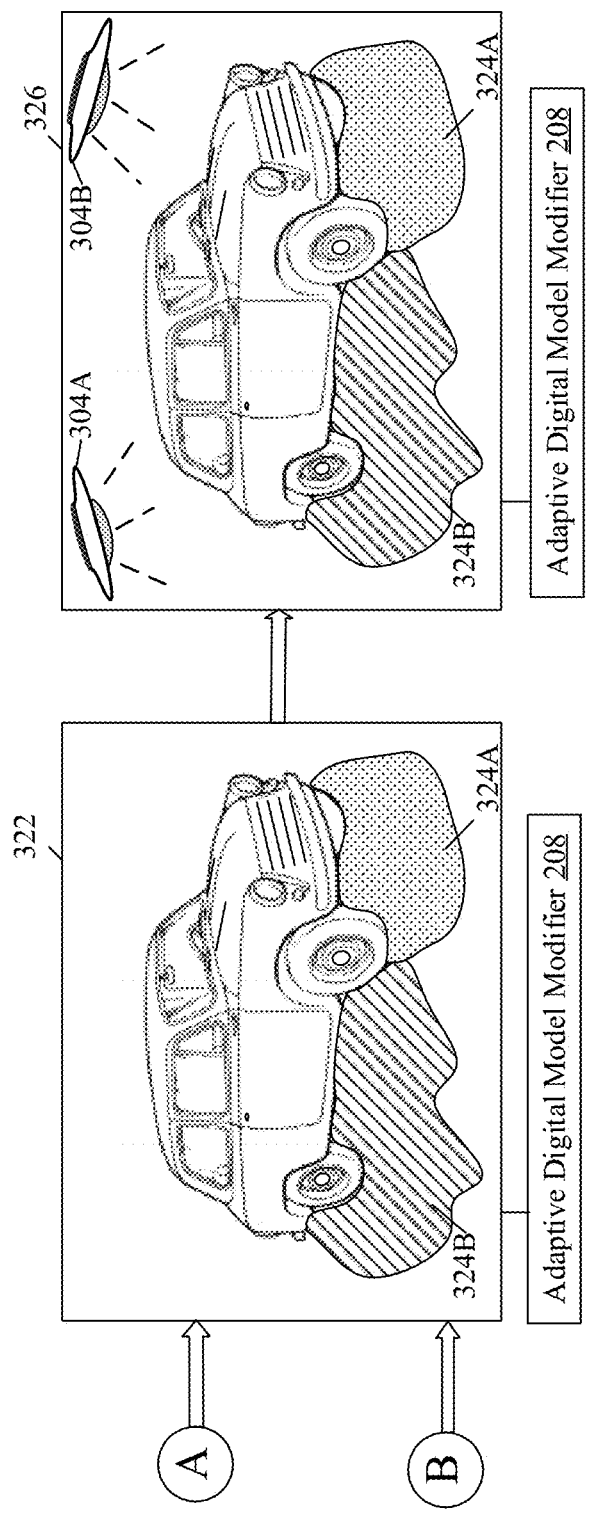

With reference to FIG. 3B and FIG. 3C, exemplary operations of an exemplary display apparatus are illustrated. In FIG. 3A, at 310, a first 360° image may be captured from the real-world environment 106 by the image sensor 104. The captured first 360° image may comprise the first light source 304A and the second light source 304B. The first 360° image may be an equirectangular image. The processor 204 may be configured to compute a total luminance intensity and an average luminance of the captured 360° image, as discussed in FIG. 2.

At 312, a first 3D model 314 may be stored in the memory 210. The first 3D model 314 may be the 3D CG model of a vehicle, such as the first car. The first 3D model 314 may be a textured and rigged 3D model. The first 3D model 314 may be selected by the user 306 from the application interface rendered on the display screen of the display apparatus 308.

At 316, a binary threshold image may be generated for the captured 360° image based on the computed total luminance intensity and the computed average luminance of the captured 360° image, as discussed in FIG. 2. The processor 204 may be configured to generate the binary threshold image (e.g., black and white pixel values only). The binary threshold image may comprise a first region 318A and a second region 318B which corresponds to the first light source 304A and the second light source 304B of the 3D real-world environment 302 respectively. The learning engine 206 may be configured to detect (and recognize) the first light source 304A and the second light source 304B in the captured 360° image.

At 320, an area, a shape, and a centroid 318C of each of the first region 318A and the second region 318B may be computed. The processor 204 may be configured to compute the area, the shape, and the centroid 318C, and light intensity of each of the first region 318A and the second region 318B. In accordance with an embodiment, the processor 204 may be configured to determine a position of each of the plurality of light sources (such as the first light source 304A and the second light source 304B) in the 3D real-world environment 302, using a corresponding centroid (such as the centroid 318C) as described, for example, in FIG. 2. The processor 204 may be configured to assign a weight to each of the plurality of light sources. The processor 204 may be further configured to determine a plurality of lighting parameters of the first light source 304A, and the second light source 304B, based on at least the computed shape, the computed area of each of first region 318A and the second region 318B, as discussed in FIG. 1, and FIG. 2. The computed shape of the first region 318A and the second region 318B may depend upon a shape of the first light source 304A, and the second light source 304B. For example, in cases where the first light source 304A, and the second light source 304B is oval, the first region 318A and the second region 318B may be elliptical or oval, as illustrated in FIG. 3B. The plurality of lighting parameters may be further determined based on the determined position of each of the plurality of light sources (such as the first light source 304A and the second light source 304B) and light intensity associated with each of the plurality of regions (such as the first region 318A and the second region 318B) of the captured 360° image.

With reference to FIG. 3B, at 322, an illumination model, a surface reflection model, and a shadow model may be generated for the first 3D model 314 based on the determined plurality of lighting parameters of the first light source 304A, and the second light source 304B. The adaptive digital model modifier 208 may be configured to generate the illumination model, the surface reflection model, and the shadow model for the first 3D model 314. The generated shadow model may comprise a plurality of shadow areas of the first 3D model 314. For example, the adaptive digital model modifier 208 may be configured to generate a first shadow area 324A for the first 3D model 314 based on the determined plurality of lighting parameters of the first light source 304A. The first shadow area 322A may correspond to a first shadow of the first 3D model 314 that may be visualized in the 3D real-world environment 302. The first shadow may be caused and rendered as a result of light emitted by the first light source 304A in the 3D real-world environment 302. The adaptive digital model modifier 208 may be configured to generate a second shadow area 3242B for the first 3D model 314 based on the determined plurality of lighting parameters of the second light source 304B. The second shadow area 324B may correspond to a second shadow of the first 3D model 314 visualized via the display apparatus 308, where the second shadow is caused as a result of light emitted by the second light source 304B in the 3D real-world environment 302.

The adaptive digital model modifier 208 may be configured to apply the first generated illumination model, the generated surface reflection model, and the generated shadow model on the first 3D model 314. For example, the adaptive digital model modifier 208 may be configured to apply the first shadow area 320A and the second shadow area 320B onto the first 3D model 314.

At 326, the first 3D model 314 may be rendered in a media content with a realistic lighting, reflection, and shadow such that the first 3D model 314 in the media content exhibits a minimum deviation (or appearance bias) in an actual lighting condition of the 3D real-world environment 302 during visualization of the first 3D model 314 at the display apparatus 308. The actual lighting condition of the 3D real-world environment 302 corresponds to the presence of actual lighting of the first light source 304A and the second light source 304B. The adaptive digital model modifier 208 may be configured to render the first 3D model 314 in the media content. In the AR mode of the display apparatus 308, the media content may be a 360° live preview of the captured scene of the 3D real-world environment 302. Alternatively stated, the display apparatus 308 provides the ability to visualize a virtual object, such as the 3D model, in a real environment (e.g., the 3D real-world environment 302.), where each physical object or virtual object in the captured scene of the 3D real-world environment 302 is lit by 360° environment light. This enables virtual graphics, such as the rendered 3D models, to represent the real-world lighting effect of a real-world scene captured by the image sensor 104 (i.e., a 360° camera). Alternatively stated, the rendered media content may comprise a realistic depiction of a scene of the first 3D model 314 in the 3D real-world environment 302. The depicted scene comprises the first 3D model 314 in the first lighting condition generated by the first light source 304A and the second light source 304B in the 3D real-world environment 302.

Figure 3D:
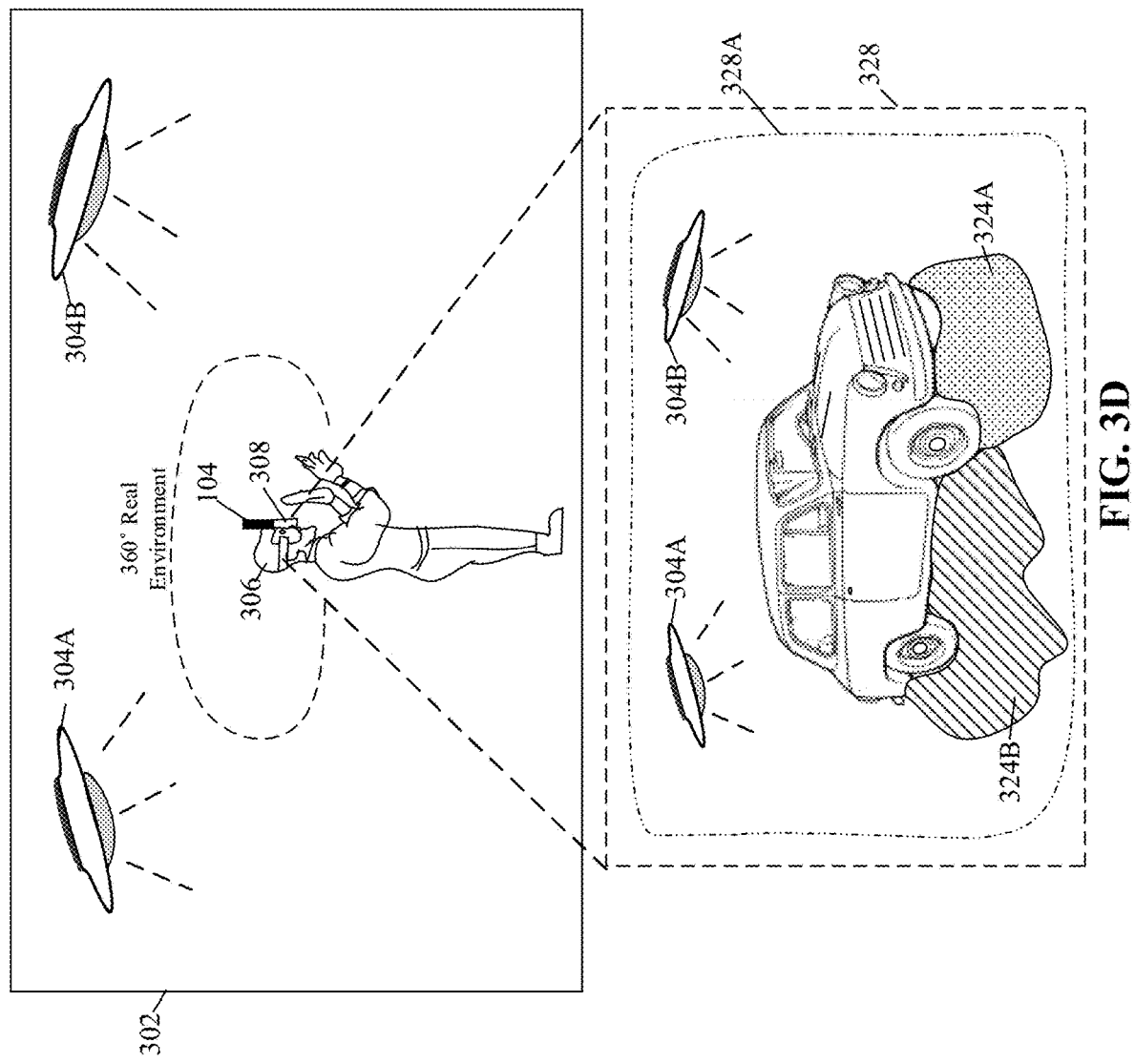

With reference to FIG. 3D, there is shown the 3D real-world environment 302. There is further shown a magnified view 328 of a portion of a display screen of the display apparatus 308. The magnified view 328 illustrates a portion 328A of a captured scene comprising the first 3D model 314 that reflects light based on actual lighting in the 3D real-world environment 302. The magnified view 328 further illustrates the first shadow area 324A associated with the first light source 304A and the second shadow area 324B associated with the second light source 304B. Alternatively stated, the display apparatus 308 may be configured to enable the user 306 to visualize the first 3D model 314 in the actual lighting condition and dynamically generated shadows caused by actual lighting in the 3D real-world environment 302.

In cases where the 3D real-world environment 302 is a vehicle showroom, the display apparatus 308 may enable the user 306 to view a very large number of vehicles in the AR view mode or the VR view mode. A traditional brick and mortar vehicle showroom may display only a limited number of vehicles in a limited space in a real environment. The display apparatus 308 may enable the user 306 to view the very large number of vehicles as realistic 3D models with an actual lighting condition of a real-world environment. In certain scenarios, the display apparatus 308 may enable the user 306 to take a virtual test drive of the first car, by using the application interface installed in the display apparatus 308.

Figure 4A:
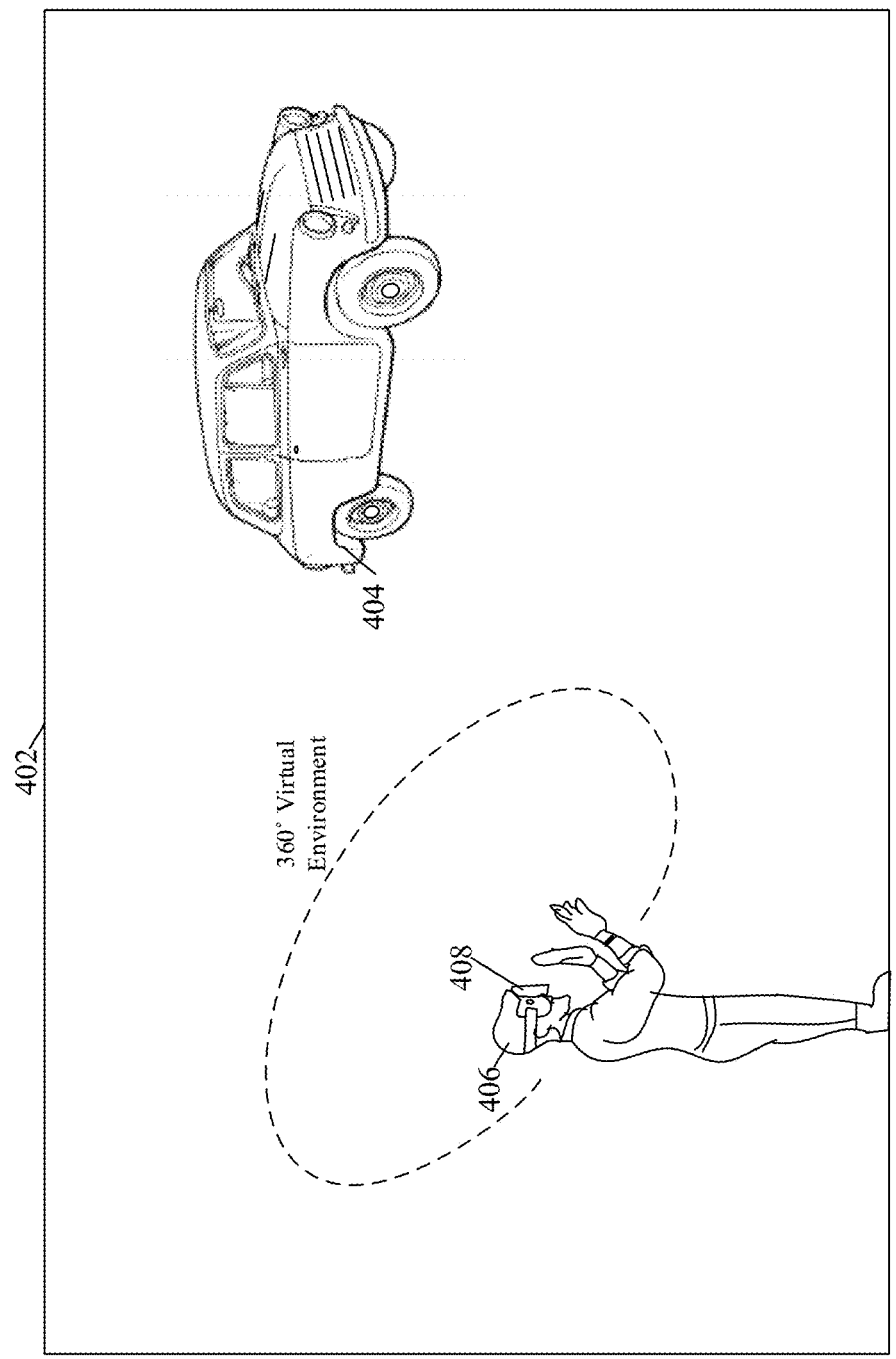

FIGS. 4A, 4B, 4C, and 4D, collectively, illustrate a second exemplary scenario for implementation of the disclosed display apparatus and method for digital 3D model rendering based on actual lighting conditions in a real environment, in accordance with an embodiment of the disclosure. FIGS. 4A to 4D are explained in conjunction with elements from FIGS. 1, 2, 3A, 3B, 3C, and 3D. With reference to FIG. 4A, there is shown a 3D real-world environment 402 (which corresponds to the real-world environment 106 (FIG. 1)). The 3D real-world environment 402 may comprise a first vehicle 404. A user 406 may be present in the 3D real-world environment 402. A display apparatus 408, such as an immersive HMD device, may be worn by a user 406 who may be present in the 3D real-world environment 402. Although the display apparatus 408 is shown as an immersive HMD device in the second exemplary scenario, the display apparatus 408 may be other types of wearable or non-wearable devices, such as a smart-glass, a hand-held device, and the like. The display apparatus 408 may be worn by the user 406.

In certain scenarios, the user 406 may intent to visualize a first 3D model of the first vehicle 404 in an environment that is different from the 3D real-world environment 402. For example, the user 406 may intent to visualize the first 3D model of the first vehicle 404 such that the first vehicle 404 is parked in a beach (a virtual environment), instead of the 3D real-world environment 402. In other scenarios, the user 406 may intent to visualize the first vehicle 404 at different lighting conditions. For example, the user 406 may intent to visualize the first vehicle 404 in one of a day time lighting condition and a night time lighting condition. In such scenarios, the user 406 may provide one or more inputs to the display apparatus 408 to launch the application interface in the display apparatus 408 and select a VR view mode. The input may be a gesture-based input, a voice-based input, or a touch-based input.

The application interface of the display apparatus 408 may display one or more details associated with each of a plurality of virtual environments, for example, a stored plurality of 360° media content items. A first environment may be selected by the user 406 from the plurality of environments displayed in the application interface. The first environment may be selected by the user 406 a gesture based, a voice based, or a touch-based input to the display apparatus 408.

In certain scenarios, information associated with the plurality of environments may be stored in the server 110. In such scenarios, the display apparatus 408 may retrieve information associated with the plurality of environments from the server 110 via the communication network 108. In other scenarios, information associated with the plurality of environments may be stored in the display apparatus 408. Information associated with the first environment may comprise at least a 360° image or 360° video of the first environment or a short description. The 360° image of the first environment may be captured by the image sensor 104 at an earlier point in time (pre-stored or pre-captured instead of live preview of surrounding environment). The captured 360° image may be stored in the server 110 or the display apparatus 406 for later retrieval. In some embodiments, the 360° image may be an equirectangular image which may comprise a 360° view of the first environment.

Figure 4B:
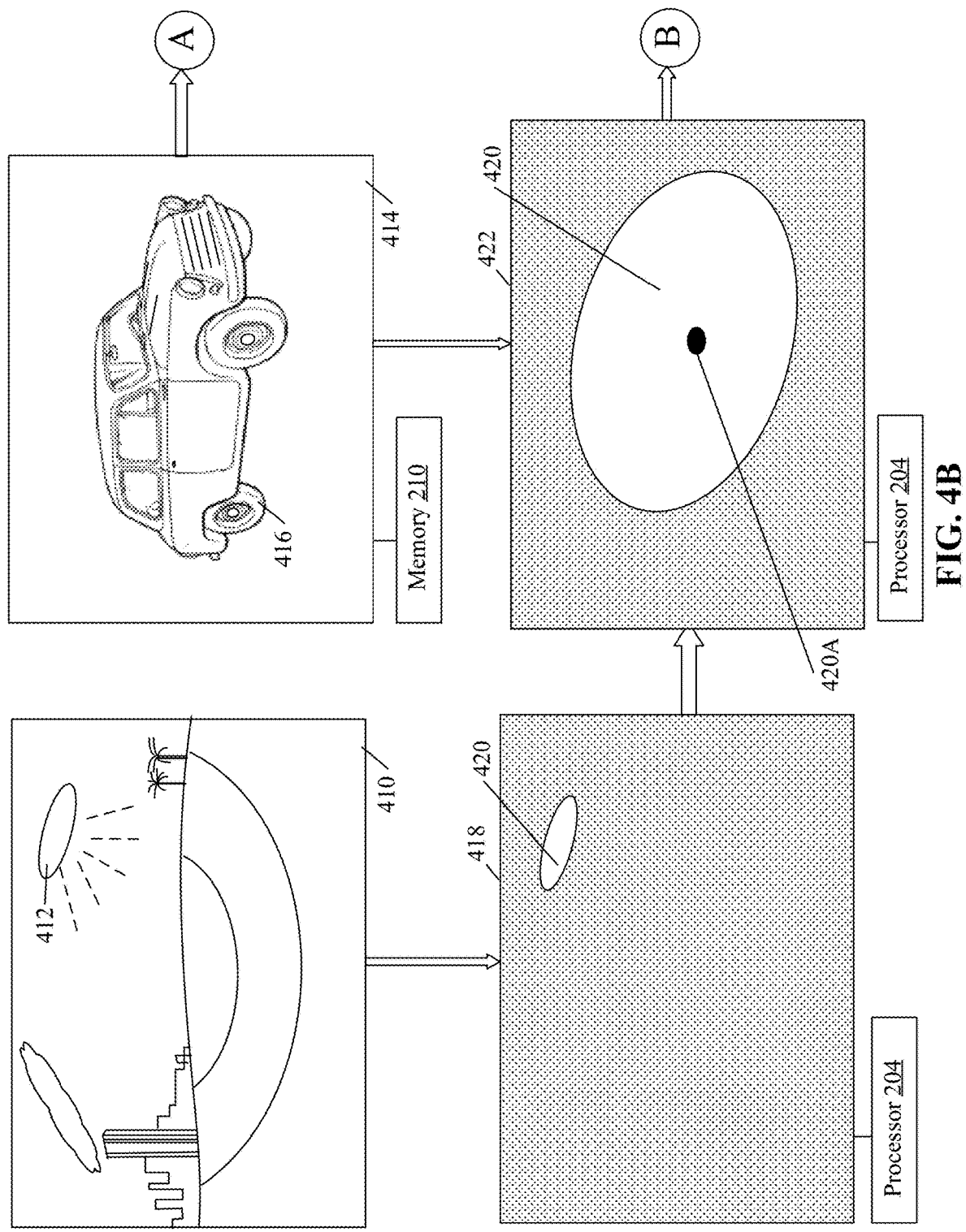
Figure 4C:
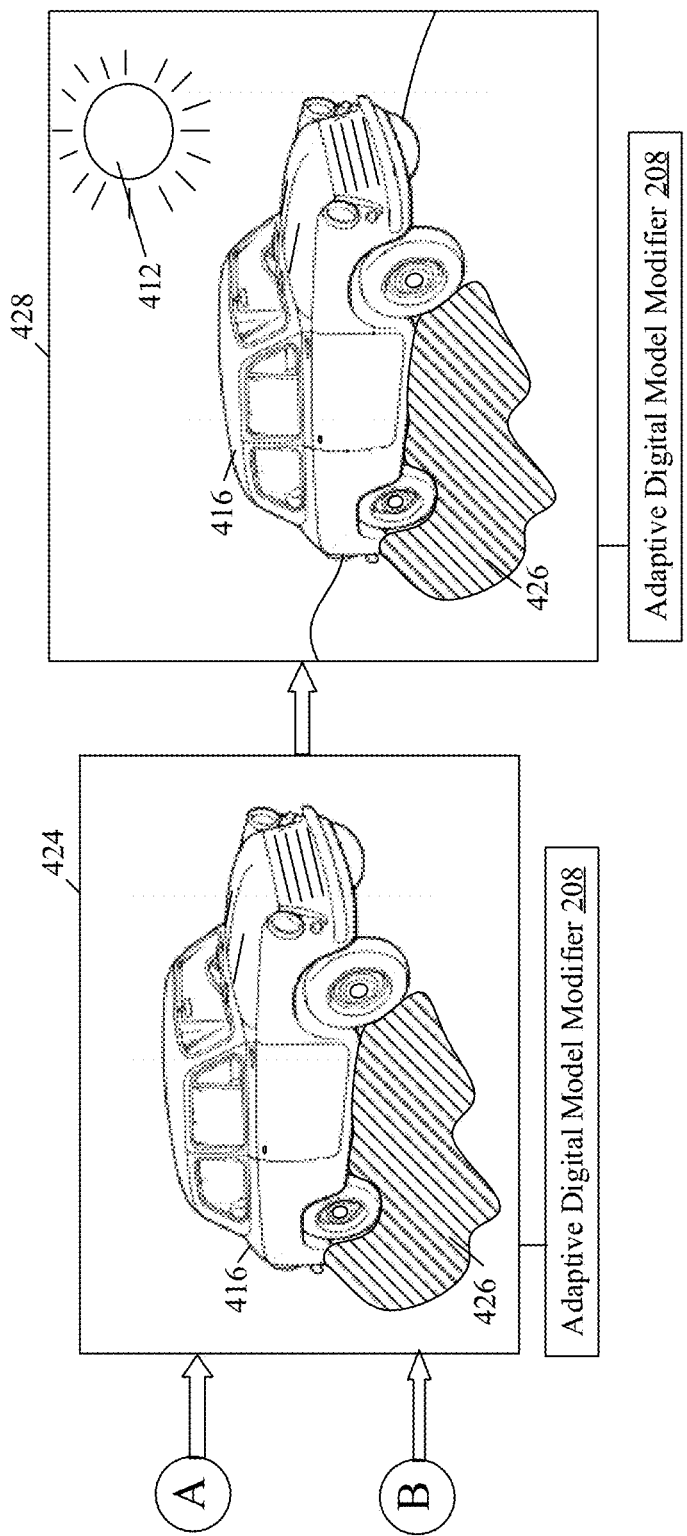

With reference to FIG. 4B and FIG. 4C, exemplary operations of an exemplary display apparatus are illustrated. In FIG. 4B, at 410, based on a rendered view of the first environment (i.e., a virtual environment), a plurality of lighting parameters for a light object in the virtual view that corresponds a light source 412 (such as a sun), may be determined.

At 414, a 3D model 416 may be stored in the memory 210. The 3D model 416 may be a textured and rigged polygonal mesh model of the first vehicle 404. At 418, a binary threshold image may be generated for the rendered view of the first environment (e.g., virtual environment) based on the computed total luminance intensity and the computed average luminance of the rendered view (or image). The processor 204 may be configured to generate the binary threshold image. The binary threshold image may comprise a first region 420 which corresponds to the light source 412. The learning engine 206 may be configured to recognize the light source 412, based on shape, positioning of the light objects with respect to other objects in the rendered view, and a plurality of luminance values of the first region 420.

At 422, an area, a shape, and a centroid 420A of the first region 420 may be computed. The processor 204 may be configured to compute the area, the shape, and the centroid 420A, and light intensity associated with the first region 420 based on a spatial position and pixel values of each of a first set of pixels of the first region 420. In accordance with an embodiment, the processor 204 may be configured to determine a position of a virtual light source, such as the light source 412, in the rendered view of the first environment using the centroid 420A, as described, for example, in FIG. 2. The processor 204 may be further configured to determine a plurality of lighting parameters of the virtual light source, such as the light source 412, based on the computed shape, the computed area, and the computed centroid 420A of the first region 420. The plurality of lighting parameters for the virtual light source, such as the light source 412, may be further determined based on the determined position of light source 412 in the rendered view and light intensity associated with the first region 420.

With reference to FIG. 4B, at 424, at least one of an illumination model, a surface reflection model, and a shadow may be generated for the 3D model 416 based on the determined plurality of lighting parameters of the first light source 412. For example, the adaptive digital model modifier 208 may be configured to dynamically generate a first shadow area 426 for the 3D model 416 based on the determined plurality of lighting parameters of the first light source 412 (in this case a virtual light source in the rendered view). The first shadow area 426 may correspond to a shadow generated by the virtual object, such as the 3D model 416 when placed in a first lighting condition determined for the rendered view in presence of the first light source 412 in the rendered view.

The adaptive digital model modifier 208 may be configured to apply at least one of the illumination model, the surface reflection model, and the shadow model on the 3D model 416 to modify the 3D model 416. For example, the adaptive digital model modifier 208 may be configured to append the first shadow area 426 to the 3D model 416 in a suitable position based on the position of the first light source 412 such that the first shadow area 426 appears realistic. Similarly, a realistic reflection caused from light from the first light source 412 may be visible on the surfaces of the rendered 3D model 416.

At 428, the rendered view and the 3D model 416 may be updated in the VR view mode. Alternatively stated, the display apparatus 308 provides the ability to visualize a virtual object in the virtual environment (e.g., the first environment), where each virtual light object (such as the light source 412) in the user-selected virtual environment (such as the first environment) influences the rendered 3D model, such as the 3D model 416.

With reference to FIG. 4D, there is shown a magnified view 430 of at least a portion of the rendered view, such as a virtual environment 430A, on a portion of a display screen of the display apparatus 408. The 3D model 416 may be moveable in rendered view, such as a virtual environment 430A, in a 360° rotation in one or more planes. The magnified view 430 includes the first shadow area 426 associated with the first light source 412. The display apparatus 408 may be configured to render and enable visualization of the 3D model 416 that is lit by the virtual light source, such as the light source 412 (a light object in the rendered view) of the virtual environment 430A.

In accordance with an alternative embodiment, a real object (such as the first vehicle 404) may be visualized in a virtual 360 environment. In such a case, the display apparatus 408 may display a live view of the real object, such as the first vehicle 404, captured by the image sensor 104 with a 360° virtual background scene that may be selected via the application interface. Alternatively stated, the display apparatus 408 may render and enable visualization of the real object (e.g., the first vehicle 404) in a lighting condition generated by the virtual light source, such as the light source 412, in the first environment (i.e., a user-selected 360° video or 360° image that may include the light source 412, such as sun).

Figure 5:
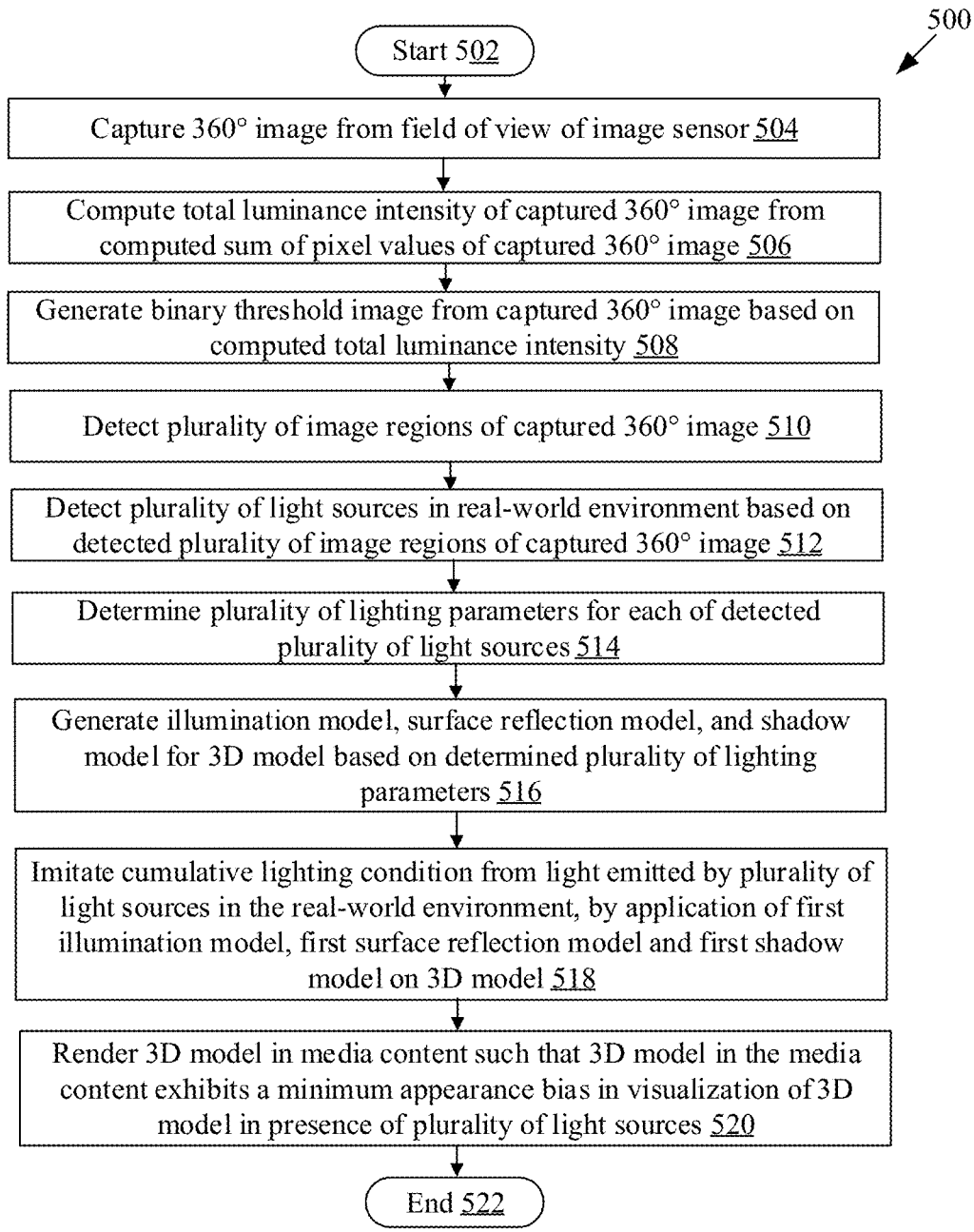
FIG. 5 is a flowchart that illustrates exemplary operations for digital 3D model rendering based on actual lighting conditions in a real environment, in accordance with an embodiment of the disclosure.

FIG. 5 is a flowchart that illustrates exemplary operations for digital 3D model rendering based on actual lighting conditions in a real environment, in accordance with an embodiment of the disclosure. With reference to FIG. 5, there is shown a flow chart 500. The flow chart is described in conjunction with FIGS. 1, 2, 3A to 3D, and 4A to 4D. The method starts at step 502 and proceeds to step 504.

At 504, a 360° image may be captured from a field-of-view (FOV) of the image sensor 104. The image sensor 104 may be configured to capture the 360° image. The image sensor 104 may be configured to store the captured 360° image in the server 110 or the memory 210.

At 506, a total luminance intensity of the captured 360° image may be computed from a sum of pixel values of a plurality of pixels of the captured 360° image. The control circuitry 202 may be configured to compute the total luminance intensity of the captured 360° image from the sum of pixel values of the plurality of pixels of the captured 360° image, as discussed, for example, in FIG. 2.

At 508, a binary threshold image may be generated from the captured 360° image, based on the computed total luminance intensity of the captured 360° image. The control circuitry 202 may be configured to generate the binary threshold image based the computed total luminance intensity of the captured 360° image, as discussed in FIG. 2.

At 510, a plurality of regions in the captured 360° image may be detected. The plurality of image regions may correspond to a plurality of light sources in the real-world environment 106. The learning engine 206 may be configured to detect and/or recognize the plurality of regions in the captured 360° image. The learning engine 206 may be configured to detect the plurality of image regions in the captured 360° image further based on the generated binary threshold image.

At 512, a plurality of light sources in the real-world environment 106 may be detected based on the detected plurality of regions (e.g., bright regions) of the captured 360° image. The control circuitry 202 may be configured to detect the plurality of light sources based on a plurality of luminance values of the plurality of image regions of the captured 360° image.

At 514, the plurality of lighting parameters may be determined for each of the plurality of light sources. The control circuitry 202 may be configured to determine the plurality of lighting parameters by the luminance-based feature extraction and shape-based feature extraction on the generated binary threshold image of the captured 360° image, as discussed in FIG. 2. The control circuitry 202 may be configured to assign the plurality of weights for the plurality of light sources based on the plurality of lighting parameters determined for each of the plurality of light sources.

At 516, an illumination model, a surface reflection mode, and a shadow model may be generated for the 3D model based on the determined plurality of lighting parameters for each of the plurality of light sources. The control circuitry 202 may be configured to generate the illumination model, the surface reflection mode, and the shadow model of the 3D model further based on the plurality of weights assigned to the plurality of light sources, as discussed in FIG. 1. The control circuitry 202 may be configured to apply the generated illumination model, the generated surface reflection mode, and the generated shadow model of the 3D model based on the assigned plurality of weights.

At 518, a cumulative lighting condition from light emitted by the plurality of light sources in the real-world environment 106, may be imitated (or reproduced), by application of a first illumination model, a first surface reflection mode, and a first shadow model on the 3D model. The first illumination model, the first surface reflection mode, and the first shadow model may correspond to the illumination model, the surface reflection mode, and the shadow model generated by the control circuitry 202 based on the determined plurality of lighting parameters for each of the plurality of light sources.

At 520, the 3D model may be rendered in media content such that the 3D model in the media content exhibits a minimum appearance bias (or a minimum deviation) in visualization of the 3D model in presence of the detected at least one light source. The control circuitry 202 may be configured to render the media content (e.g. a live 360° preview) on a display screen of the display apparatus 102. The control may pass to end at 522.

Figure 6A:
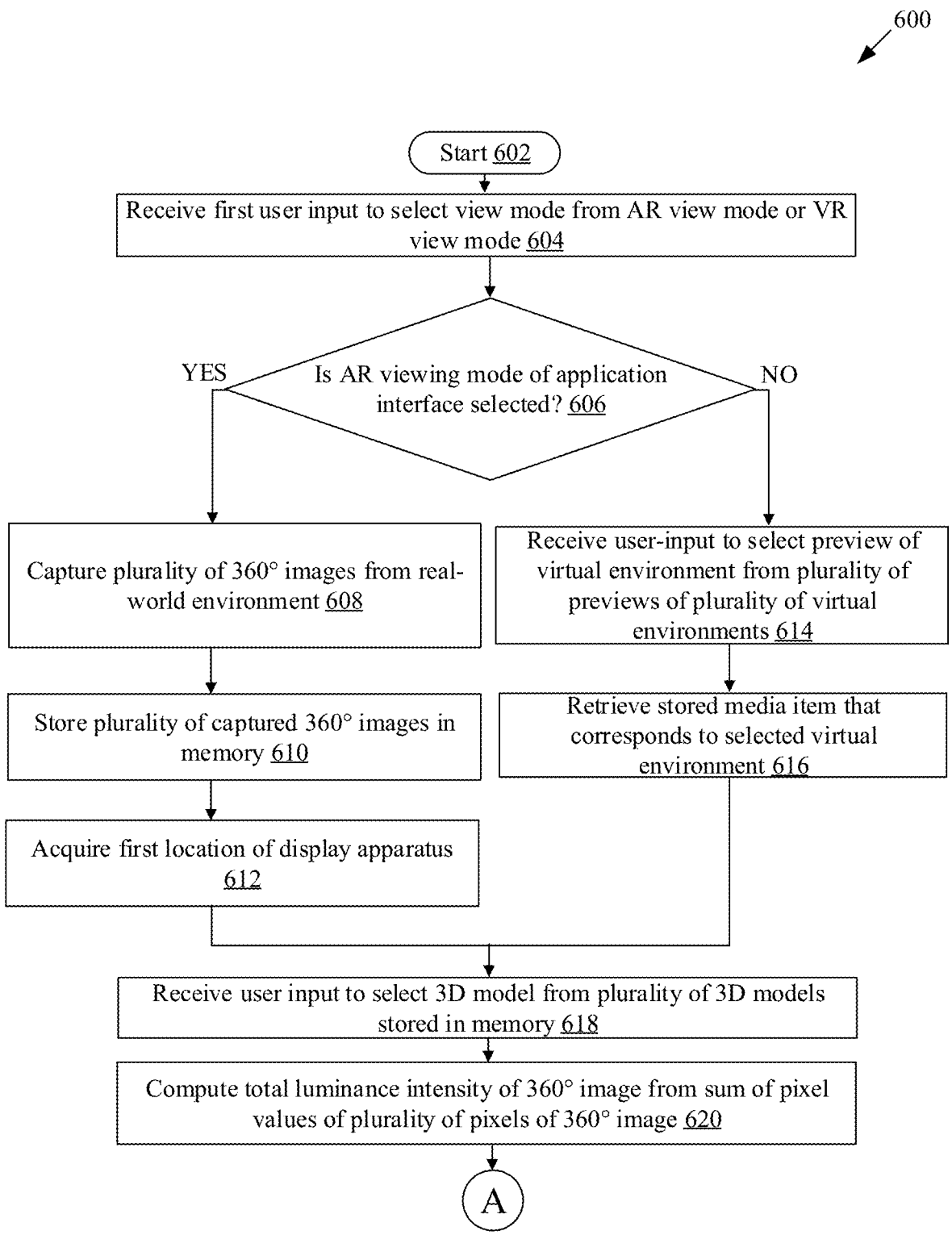
FIGS. 6A, 6B, and 6C collectively depict a flowchart that illustrates exemplary operations for digital 3D model rendering based on actual lighting conditions in a real environment, in accordance with an embodiment of the disclosure.
Figure 6B:
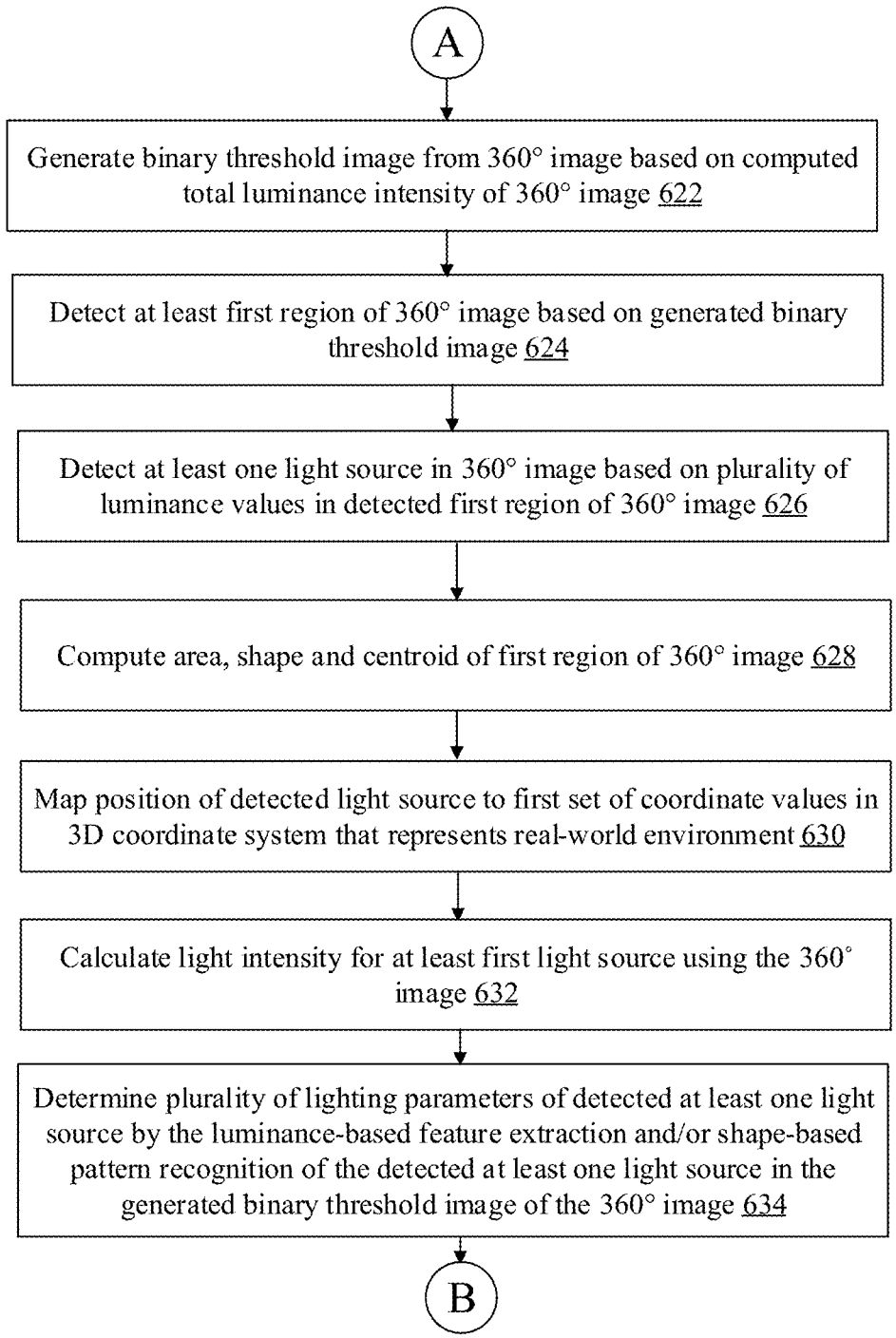
Figure 6C:
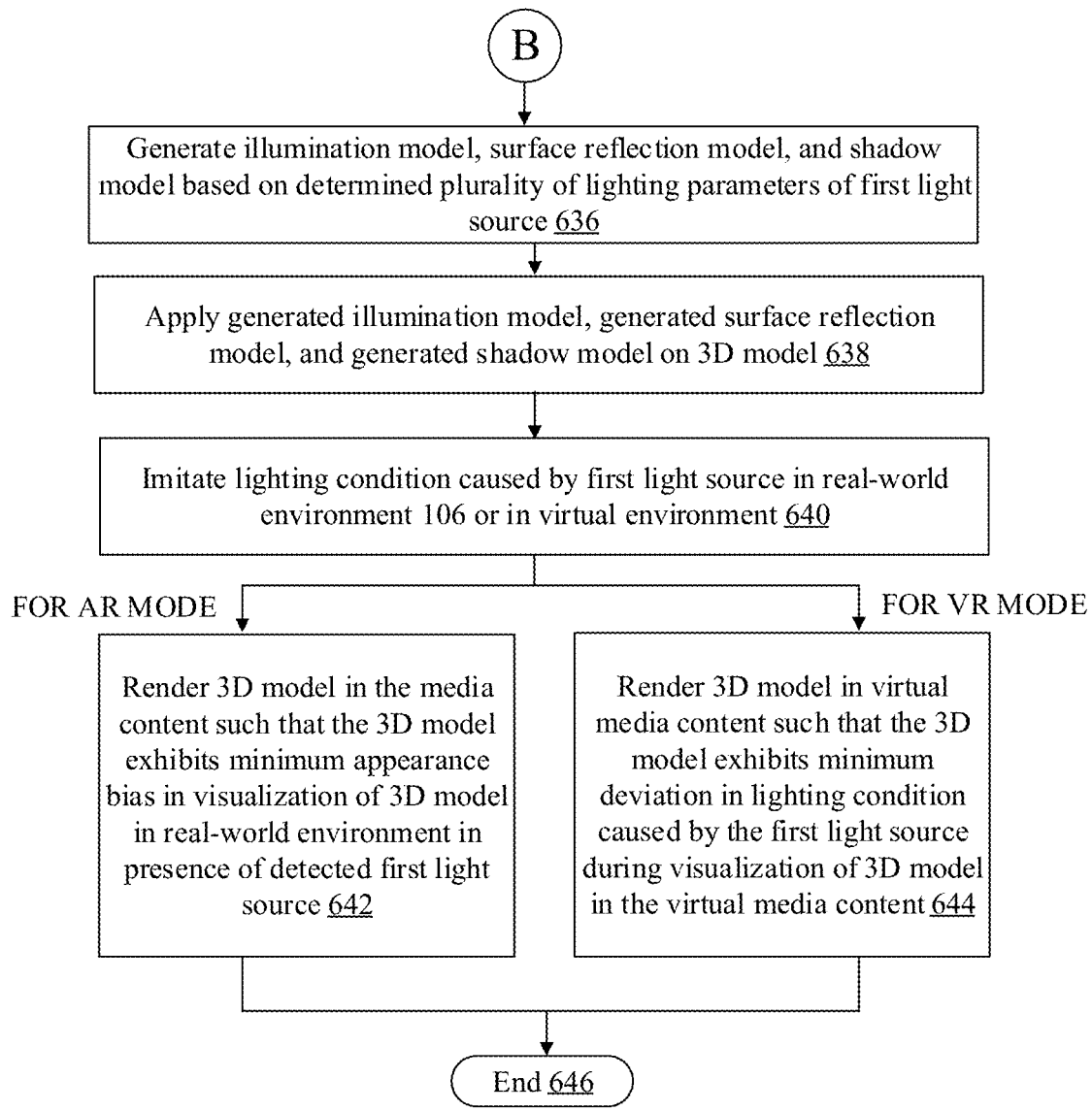

FIGS. 6A, 6B, and 6C collectively depict a flowchart that illustrates exemplary operations for digital 3D model rendering based on actual lighting conditions in a real environment, in accordance with an embodiment of the disclosure. With reference to FIG. 6A, there is shown a flow chart 600. The flow chart is described in conjunction with FIGS. 1, 2, 3A to 3D, 4A to 4D, and 5. The method starts at step 602 and proceeds to step 604.

At 604, a first user input may be received to select a view mode from an AR view mode or a VR view mode, via an application interface of the display apparatus 102. In some embodiments, the application interface may be automatically rendered when a power button of the display apparatus 102 is switched "ON". In some embodiments, a user input may be required to launch the application interface.

At 606, it may be determined whether the AR viewing mode or the VR viewing is selected. In cases where the AR viewing mode is selected, the control may pass to 608. Otherwise, the control may pass to 614.

At 608, a plurality of 360° images may be captured from the image sensor 104 of the real-world environment 106. The image sensor 104 may be configured to capture the plurality of 360° images of the real-world environment 106. The captured plurality of images may comprise a plurality of equirectangular images of the real-world environment 106. Each of the plurality of equirectangular images may comprise a 360° view of the real-world environment 106. Each 360° image (or the 360° video) may be a live preview that may be captured in a real time or near-real time of the real-world environment. Further, each 360° image (or the 360° video) of the plurality of 360° images may comprise a plurality of real objects including one or more light sources of the real-world environment 106.

At 610, the plurality of 360° images may be stored in the memory 210. The memory 210 or the server 110 may also store a plurality of 3D models. Each of the plurality of 3D models may be a textured and rigged polygonal mesh model of a real object or a fantastical object. The plurality of 360° images may be a sequence of equirectangular image frames, such as a 360° video. In some embodiments, the image sensor 104 may be configured to communicate the captured plurality of 360° images of the real-world environment 106 to the server 110 via the communication network 108.

At 612, a first location of the display apparatus 102 may be acquired. The first location may correspond to a first set of coordinate values in a three-dimensional coordinate system (such as a Cartesian coordinate system) of the real-world environment 106

At 614, a user-input may be received via the application interface to select a preview of a virtual environment from a plurality of previews of a plurality of virtual environments, stored in the memory 210 or the server 110. Each of the plurality of virtual environments may be a pre-stored 360° image, pre-stored 360° video, or 3D graphics. The preview may correspond to a representation of actual virtual environment before the actual virtual environment is made available or played.

At 616, a stored media item (e.g., a pre-stored 360° image or 360° video) that corresponds to the selected virtual environment, may be retrieved. The control circuitry 202 may be configured to retrieve the stored media item from the memory 210 or the server 110.

At 618, a user input may be received to select a 3D model from the plurality of 3D models stored in the memory 210.

The control circuitry 202 may be configured to receive the user input, via the application interface using the I/O device 214.

At 620, a total luminance intensity of the 360° image (captured in real time in case of AR view mode or previously stored 360° image in case of VR mode) may be computed from a sum of pixel values of a plurality of pixels of the 360° image. In case of the 360° video (captured in real time or previously captured), such total luminance intensity and other operations may be executed frame by frame. The control circuitry 202 may be configured to compute the total luminance intensity of the 360° image from the computed sum of a plurality of luminance values of the 360° image, as discussed, for example, in FIG. 2. The control circuitry 202 may be further configured to compute an average luminance of the 360° image (captured in real time for AR view mode or previously stored 360° image for VR view mode) based on the computed total luminance intensity, the width of the 360° image (captured in real time for AR view mode or previously stored 360° image for VR view mode), and the height of the 360° image. The control circuitry 202 may be further configured to compute the input luminance threshold based on the average luminance of the 360° image.

At 622, a binary threshold image may be generated from the 360° image (captured in real time for AR view mode or previously stored 360° image for VR view mode) based on the computed total luminance intensity of the 360° image. The control circuitry 202 may be configured to generate the binary threshold image based on the input luminance threshold computed from the total luminance intensity of the 360° image (captured in real time for AR view mode or previously stored 360° image for VR view mode), as discussed, for example, in FIG. 2.

At 624, at least a first region of the 360° image (captured in real time for AR view mode or previously stored 360° image for VR view mode) may be detected based on the generated binary threshold image. The first region may correspond to the first light source 112A in the real-world environment 106. The learning engine 206 may be configured to detect the first region in the 360° image (captured in real time for AR view mode or previously stored 360° image for VR view mode), as discussed, for example, in FIG. 2.

At 626, at least one light source may be detected in the 360° image (captured in real time for AR view mode or previously stored 360° image for VR view mode) based on the plurality of luminance values in the detected first region of the 360° image (captured in real time for AR view mode or previously stored 360° image for VR view mode). The at least one light source may correspond to the first light source (i.e., a real light source (e.g., the first light source 112A) in case of AR view mode or virtual light object (e.g., the light source 412) in case of VR view mode). The control circuitry 202 may be configured to detect the first light source based on a plurality of luminance values of the detected first region of the 360° image (captured in real time for AR view mode or previously stored 360° image for VR view mode), as discussed, for example, in FIG. 2.

At 628, an area, a shape and a centroid of the first region of the 360° image (captured in real time for AR view mode or previously stored 360° image for VR view mode) may be computed. The control circuitry 202 may be configured to compute the area, the shape, and the centroid of the first region based on a spatial position of each of a plurality of pixels in the first region. The computed area of the first region may correspond to a size of the first light source. Further, the computed shape of the first region may correspond to a shape of the first light source.

At 630, a position of the detected light source (e.g., the first light source 112A or the light source 412) may be mapped to a first set of coordinate values in a 3D coordinate system that represents the real-world environment 106. The control circuitry 202 may be configured to map the position of the first light source in the real-world environment 106 or in the selected virtual environment. A conversion of the two dimensional (2D) spatial position of the computed centroid in the first region in the 360° image (captured in real time for AR view mode or previously stored 360° image for VR view mode) to a 3D position in the 3D coordinate system that represents the real-world environment 106, may be done to map the position of the first light source.

At 632, a light intensity for at least the first light source may be calculated using the 360° image. In accordance with an embodiment, the control circuitry 202 may be further configured to calculate the light intensity for at least the first light source. The light intensity for the first light source may be computed based on a light area (area of the first region, the binary threshold image (overall brightness of the image), and a control value, as given be equation (3). In cases where there are more than one light source, the control circuitry 202 may be configured to assign a plurality of weights to the plurality of light sources, as given in equation (4).

At 634, a plurality of lighting parameters of the detected at least one light source (e.g., the first light source 112A or the light source 412) may be determined by the luminance-based feature extraction and/or the shape-based pattern recognition of the detected at least one light source in the generated binary threshold image of the 360° image (captured in real time for AR view mode or previously stored 360° image for VR view mode). The plurality of lighting parameters may be determined based on the computed shape, size, light intensity, and the position of the at least one light source (e.g., the first light source 112A or the light source 412). In some cases, the light model and a color of the detected first light source in the 360° image, may also be utilized for the determination of the plurality of lighting parameters. The determined plurality of lighting parameters may correspond to a lighting condition created by light emitted by the first light source in the real-world environment 106 or the rendered view of the virtual environment.

At 636, an illumination model, a surface reflection model, and a shadow model may be generated for the 3D model based on the determined plurality of lighting parameters of the first light source. The control circuitry 202 may be configured to generate the illumination model, the surface reflection model, and the shadow model.

At 638, the generated illumination model, the generated surface reflection model, and the generated shadow model may be applied on the 3D model. The control circuitry 202 may be configured to apply the generated illumination model, the generated surface reflection model, and the generated shadow model on the 3D model.

At 640, a lighting condition caused by the first light source in the real-world environment 106 (in AR view mode) or in the virtual environment (in VR view mode), may be imitated (or reproduced). Such imitation or reproduction of the lighting condition may be done based on the applied illumination model, the surface reflection model, and the shadow model on the 3D model. The control circuitry 202 may be configured to imitate (or reproduce) the lighting condition caused by (or generated by) the first light source on the 3D model.

At 642, for the AR view mode, the 3D model may be rendered in the media content (i.e., the 360° image or the 360° video captured in real time or near real time by the image sensor 104) such that the 3D model exhibits a minimum appearance bias (i.e., a minimum deviation in lighting representation) in visualization of the 3D model in the real-world environment 106 in presence of the detected first light source. Alternatively stated, the display apparatus 102 provides the ability to visualize a virtual object, such as the 3D model, in a real environment (e.g., the real-world environment 106), where each physical object or virtual object in the captured scene of the real-world environment 106 is lit by 360° environment light. This enables virtual graphics, such as the rendered 3D models, to represent the real-world lighting effect of a real-world scene captured by the image sensor 104 (i.e., a 360° camera).

At 644, for the VR view mode, the 3D model may be rendered in the virtual media content (i.e., pre-stored 360° image, 360° video, or other gaming 3D graphics, as a virtual environment) such that the 3D model exhibits a minimum deviation in the lighting condition caused by the detected first light source (e.g. a virtual light source, such as the light source 412) during visualization of the 3D model in the virtual media content. Alternatively stated, the display apparatus 102 provides the ability to visualize a virtual object, such as the 3D model, in a virtual environment (e.g., user-selected media content, computer generated 3D graphics, or 360° media content), where each 3D model (a virtual object) can be lit by light from another virtual light object (e.g., the light source 412) present in the virtual media content. This enables virtual graphics, such as the rendered 3D models, to represent (reflect) the lighting from the virtual light object. The control may pass to end at 644.

In accordance with an embodiment, a display apparatus (such as the display apparatus 102 (FIG. 1)) which comprises an image sensor (such as the image sensor 104 (FIG. 1)) and a control circuitry (such as the control circuitry 202 (FIG. 2)) is disclosed. The image sensor 104 may be configured to capture a 360° image in a field-of-view (FOV) of the image sensor 104. The control circuitry 202 may be configured to detect at least one light source (for e.g. the first light source 112 (FIG. 1)) in the 360° image (captured in real time for AR view mode or previously stored 360° image for VR view mode) based on a plurality of luminance values in a region of the 360° image (captured in real time for AR view mode or previously stored 360° image for VR view mode). The detected at least one light source in the region of the 360° image (captured in real time for AR view mode or previously stored 360° image for VR view mode) may be at least one of a natural light source or an artificial light source in a real-world environment.

The control circuitry 202 may be configured to determine a plurality of lighting parameters of the detected at least one light source in the 360° image, by a luminance-based feature extraction and a shape-based pattern recognition of the detected at least one light source in a binary threshold image of the 360° image (captured in real time for AR view mode or previously stored 360° image for VR view mode). The plurality of lighting parameters may include at least one of a size, a shape, an average luminance, an area, and a centroid of the detected at least one light source in the 360° image (captured in real time for AR view mode or previously stored 360° image for VR view mode). The control circuitry 202 may be configured to imitate a lighting condition generated by the detected at least one light source in the real-world environment, on a three-dimensional (3D) model by application of at least one of an illumination model, a surface reflection model, or a shadow model on the 3D model based on the determined plurality of lighting parameters. The control circuitry 202 may be configured to render the 3D model in media content such that the 3D model in the media content exhibits a minimum appearance bias in visualization of the 3D model in presence of the detected at least one light source.

Various embodiments of the disclosure may provide a non-transitory computer readable medium and/or storage medium having stored thereon, a set of instructions executable by a machine and/or a computer for digital 3D model rendering based on changes in actual lighting conditions in a real environment. The set of instructions may cause the machine and/or computer to perform operations that comprise capture of a 360° image in a field-of-view (FOV) of the image sensor. At least one light source may be detected in the 360° image (captured in real time for AR view mode or previously stored 360° image for VR view mode) based on a plurality of luminance values in a region of the 360° image (captured in real time for AR view mode or previously stored 360° image for VR view mode). The detected at least one light source in the region of the 360° image (captured in real time for AR view mode or previously stored 360° image for VR view mode) may be at least one of a natural light source or an artificial light source in a real-world environment.

Further, a plurality of lighting parameters of the detected at least one light source in the 360° image may be determined by a luminance-based feature extraction and a shape-based pattern recognition of the detected at least one light source in a binary threshold image of the captured 360° image. The plurality of lighting parameters may include at least one of a size, a shape, an average luminance, an area, and a centroid of the detected at least one light source in the captured 360° image. A lighting condition generated by the detected at least one light source in the real-world environment may be imitated on a three-dimensional (3D) model by application of at least one of an illumination model, a surface reflection model, or a shadow model on the 3D model based on the determined plurality of lighting parameters. The 3D model may be rendered in a media content such that the 3D model in the media content exhibits a minimum appearance bias in visualization of the 3D model in presence of the detected at least one light source.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A display apparatus, comprising:
an image sensor to capture a 360° image in a field-of-view (FOV) of the image sensor; and
control circuitry configured to:
    detect at least one light source in the captured 360° image based on a plurality of luminance values in a region of the captured 360° image, wherein the detected at least one light source in the region of the captured 360° image is at least one of a natural light source or an artificial light source in a real-world environment;
    determine a plurality of lighting parameters of the detected at least one light source in the 360° image, wherein the plurality of lighting parameters is determined based on computation of at least a light intensity of light emitted by the detected at least one light source using a binary threshold image of the captured 360° image;
    reproduce a lighting condition caused by the detected at least one light source in the real-world environment, on a three-dimensional (3D) model based on the determined plurality of lighting parameters; and
    render the 3D model along with 360° media content that includes at least the captured 360° image at the display apparatus such that the reproduced lighting condition is visible on the rendered 3D model that is surrounded by the 360° media content, and wherein the rendered 3D model exhibits a minimum deviation in representation of a light reflection caused by the detected at least one light source on the rendered 3D model during visualization of the 3D model at the display apparatus in presence of the detected at least one light source.

2. The display apparatus of claim 1, wherein the captured 360° image is an equirectangular image that comprises a 360° view of the real-world environment, and wherein the 3D model in the 360° media content is rendered in real time or near-real time with the capture of the 360° image from the real-world environment.

3. The display apparatus of claim 1, further comprising an input/output (I/O) device configured to receive a plurality of user inputs, wherein the control circuitry is further configured to customize the rendered 3D model based on the received plurality of user inputs.

4. The display apparatus of claim 3, wherein the I/O device is further configured to receive a first user input of the plurality of user inputs, the first user input includes a first user-defined light intensity to change the at least the light intensity associated with the detected at least one light source, wherein the control circuitry is further configured to render the 3D model in the 360° media content such that the rendered 3D model in the 360° media content is lit by the detected at least one light source in the first user-defined light intensity.

5. The display apparatus of claim 1, wherein the control circuitry is further configured to compute a total luminance intensity of the captured 360° image from a computed sum of pixel values of a plurality of pixels of the captured 360° image, and wherein the control circuitry is further configured to generate the binary threshold image from the captured 360° image, based on the computed total luminance intensity.

6. The display apparatus of claim 1, wherein the control circuitry is further configured to compute at least an area, a shape, and a centroid of the region of the captured 360° image, and wherein the plurality of lighting parameters is determined based on at least the computed area, the shape, and the centroid of the region of the captured 360° image.

7. The display apparatus of claim 6, wherein the control circuitry is further configured to map a spatial position of the centroid of the region that represents the detected at least one light source, to a 3D position of the at least one light source in the real-world environment using a 3D coordinate system which represents the real-world environment in a three-dimensional coordinate space, wherein the plurality of lighting parameters is further determined based on the 3D position of the at least one light source in the real-world environment.

8. The display apparatus of claim 7, wherein the control circuitry is further configured to estimate a relative distance of the 3D model from the detected at least one light source in the real-world environment, and wherein the control circuitry is further configured to adjust a shadow area of the rendered 3D model based on the estimated relative distance of the 3D model from the detected at least one light source.

9. The display apparatus of claim 8, wherein the control circuitry is further configured to adjust a smoothness parameter of the shadow area of the 3D model, based on the estimated relative distance between the 3D model and the at least one light source in the real-world environment and the light intensity of the at least one light source.

10. The display apparatus of claim 1, wherein the control circuitry is further configured to estimate a color of light emitted from the detected at least one light source by extraction of a color component of a plurality of pixels of the region of the captured 360° image.

11. The display apparatus of claim 1, wherein the control circuitry is further configured to detect a plurality of regions in the captured 360° image, wherein the plurality of regions correspond to a plurality of light sources in the real-world environment, wherein the control circuitry is further configured to determine the plurality of lighting parameters for each of the plurality of light sources, wherein the plurality of regions in the captured 360° image includes the region of the captured 360° image, and wherein the plurality of light sources includes the at least one light source of the captured 360° image.

12. The display apparatus of claim 11, wherein the control circuitry is further configured to generate an illumination model, a surface reflection model, and a shadow model for the 3D model based on the determined plurality of lighting parameters for each of the plurality of light sources.

13. The display apparatus of claim 12, wherein the control circuitry is further configured to apply the generated illumination model, the surface reflection model, and the shadow model on the 3D model to reproduce a different lighting condition caused by light emitted from the plurality of light sources in the real-world environment.

14. The display apparatus of claim 13, wherein the control circuitry is further configured to determine a color of each of the plurality of light sources in the real-world environment based on a color component of pixels in each of the plurality of regions.

15. The display apparatus of claim 13, wherein the control circuitry is further configured to dynamically change the representation of the light reflection on the rendered 3D model or a shadow of the rendered 3D model during visualization of the 3D model at the display apparatus based on a corresponding change in an actual lighting condition in the real-world environment.

16. A method comprising:
in a display apparatus that comprises an image sensor and control circuitry:
capturing, by the image sensor, a 360° image in a field-of-view (FOV) of the image sensor;
detecting, by the control circuitry, at least one light source in the captured 360° image based on a plurality of luminance values in a region of the captured 360° image, wherein the detected at least one light source in the region of the captured 360° image is at least one of a natural light source or an artificial light source in a real-world environment;
determining, by the control circuitry, a plurality of lighting parameters of the detected at least one light source in the 360° image, wherein the plurality of lighting parameters is determined based on computation of at least a light intensity of light emitted by the at least one light source using a binary threshold image of the captured 360° image;
reproducing, by the control circuitry, a lighting condition caused by the at least one light source in the real-world environment, on a three-dimensional (3D) model based on the determined plurality of lighting parameters; and
rendering, by the circuitry circuitry, the 3D model along with 360° media content that includes at least the captured 360° image at the display apparatus such that the reproduced lighting condition is visible on the rendered 3D model that is surrounded by the 360° media content, and wherein the rendered 3D model exhibits a minimum deviation in representation of a light reflection caused by the detected at least one light source on the rendered 3D model during visualization of the 3D model at the display apparatus in presence of the detected at least one light source.

17. The method of claim 16, further comprising computing, by the control circuitry, a total luminance intensity of the captured 360° image, from a computed sum of pixel values of a plurality of pixels of the captured 360° image, and further comprising generating, by the control circuitry, the binary threshold image from the captured 360° image, based on the computed total luminance intensity.

18. The method of claim 16, further comprising generating, by the control circuitry, an illumination model, a surface reflection model, and a shadow model for the 3D model based on the determined plurality of lighting parameters for the at least one light source.

19. The method of claim 18, wherein the control circuitry is further configured to apply the generated illumination model, the surface reflection model, and the shadow model on the 3D model to reproduce the lighting condition caused by light emitted from the at least one light source in the real-world environment.

20. The method of claim 16, further comprising dynamically changing, by the control circuitry, the representation of the light reflection on the rendered 3D model or a shadow of the rendered 3D model during visualization of the 3D model at the display apparatus based on a corresponding change in an actual lighting condition in the real-world environment.

* * * * *